United States Patent
Choi et al.

(10) Patent No.: US 11,563,889 B2
(45) Date of Patent: Jan. 24, 2023

(54) ELECTRONIC DEVICE AND METHOD FOR CONTROLLING CAMERA USING EXTERNAL ELECTRONIC DEVICE

(71) Applicant: Samsung Electronics Co., Ltd., Suwon-si (KR)

(72) Inventors: Jongbum Choi, Suwon-si (KR); Arang Lee, Suwon-si (KR); Sungoh Kim, Suwon-si (KR); Hyunhee Park, Suwon-si (KR); Donghyun Yeom, Suwon-si (KR); Jonghoon Won, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 16/840,986

(22) Filed: Apr. 6, 2020

(65) Prior Publication Data
US 2020/0322530 A1    Oct. 8, 2020

(30) Foreign Application Priority Data
Apr. 5, 2019   (KR) .................. 10-2019-0040185

(51) Int. Cl.
*H04N 5/232* (2006.01)
*H04N 21/2343* (2011.01)
*G06T 5/50* (2006.01)

(52) U.S. Cl.
CPC .......... *H04N 5/23229* (2013.01); *G06T 5/50* (2013.01); *H04N 21/234327* (2013.01); *H04N 21/234363* (2013.01); *G06T 2207/20221* (2013.01)

(58) Field of Classification Search
None
See application file for complete search history.

(56) References Cited

U.S. PATENT DOCUMENTS

| 6,809,759 B1 * | 10/2004 | Chiang | ............. H04N 5/23203 348/211.2 |
| 9,536,285 B2 * | 1/2017 | Wang | ................. H04N 1/00167 |

(Continued)

FOREIGN PATENT DOCUMENTS

| EP | 2 993 890 A1 | 3/2016 |
| EP | 3 435 655 A1 | 1/2019 |

(Continued)

OTHER PUBLICATIONS

International Search Report dated Jul. 27, 2020, issued in International Application No. PCT/KR2020/004595.

(Continued)

*Primary Examiner* — James M Hannett
(74) *Attorney, Agent, or Firm* — Jefferson IP Law, LLP

(57) ABSTRACT

An electronic device and method are provided. The electronic device includes a camera, a communication circuit, and a processor configured to be operably coupled to the camera and the communication circuit. The processor is further configured to receive first image data from the camera by controlling the camera based on a first parameter, transmit the first image data to an external electronic device by using the communication circuit in response to acquisition of the first image data, identify a second parameter for controlling the camera at least based on the external electronic device having received the first image data, and acquire second image data by controlling the camera based on the second parameter in response to the identification of the second parameter.

18 Claims, 16 Drawing Sheets

(56) References Cited

U.S. PATENT DOCUMENTS

| | | | | |
|---|---|---|---|---|
| 2011/0249086 A1* | 10/2011 | Guo | ................... | H04N 5/2624 |
| | | | | 348/14.12 |
| 2011/0292181 A1* | 12/2011 | Acharya | ................. | G07C 9/37 |
| | | | | 348/47 |
| 2012/0120261 A1* | 5/2012 | Mehra | ............... | H04N 1/00291 |
| | | | | 348/207.11 |
| 2015/0049233 A1* | 2/2015 | Choi | .................... | H04N 5/2353 |
| | | | | 348/333.01 |
| 2015/0116489 A1* | 4/2015 | Asano | ............... | H04N 5/23206 |
| | | | | 348/143 |
| 2017/0278546 A1* | 9/2017 | Xiao | .................... | G11B 27/031 |
| 2017/0280038 A1 | 9/2017 | Ai et al. | | |
| 2018/0139431 A1* | 5/2018 | Simek | ................. | H04N 5/2258 |
| 2020/0252555 A1 | 8/2020 | Choi et al. | | |

FOREIGN PATENT DOCUMENTS

| | | | |
|---|---|---|---|
| JP | 2015-198300 A | 11/2015 | |
| JP | 2016-025482 A | 2/2016 | |
| KR | 10-2019-0037842 A | 4/2019 | |
| WO | 2012/067051 A1 | 5/2012 | |
| WO | 2015/146006 A1 | 10/2015 | |
| WO | WO-2019026828 A1 * | 2/2019 | .......... G06F 16/955 |
| WO | 2019/066450 A1 | 4/2019 | |

OTHER PUBLICATIONS

European Search Report dated Apr. 4, 2022, issued in European Application No. 20783430.0.

* cited by examiner

ELECTRONIC DEVICE AND METHOD FOR CONTROLLING CAMERA USING EXTERNAL ELECTRONIC DEVICE

CROSS-REFERENCE TO RELATED APPLICATION(S)

This application is based on and claims priority under 35 U.S.C. § 119(a) of a Korean patent application number 10-2019-0040185, filed on Apr. 5, 2019, in the Korean Intellectual Property Office, the disclosure of which is incorporated by reference herein in its entirety.

BACKGROUND

1. Field

The present disclosure relates to an electronic device that controls a camera using an external electronic device, and a method thereof.

2. Description of Related Art

With the recent development of digital technology, various types of electronic devices such as mobile communication terminals, smart phones, tablet personal computers (PCs), electronic notebooks, personal digital assistants (PDAs), wearable devices, and the like are widely used. The electronic device may include one or more cameras for capturing a subject. External light reaching the camera may be electrically processed by an image sensor and/or an image signal processor (ISP) included in the electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of using an external electronic device having a higher processing capability than the electronic device.

The technical problems addressed by the disclosure are not limited to the technical problems mentioned above, and other technical problems not mentioned may also be by those skilled in the art from the following description.

Additional aspects will be set forth in part in the description which follows and, in part, will be apparent from the description, or may be learned by practice of the presented embodiments.

In accordance with an aspect of the disclosure, an electronic device is provided. The electronic device includes a camera a communication circuit and a processor configured to be operably coupled to the camera and the communication circuit. The processor is further configured to receive first image data from the camera by controlling the camera based on a first parameter, transmit the first image data to an external electronic device by using the communication circuit in response to acquisition of the first image data, identify a second parameter for controlling the camera at least based on the external electronic device having received the first image data, and acquire second image data by controlling the camera based on the second parameter in response to the identification of the second parameter.

In accordance with another aspect of the disclosure, an electronic device is provided. The electronic devices includes a plurality of cameras, a communication circuit, a display, and at least one processor configured to be operably coupled to the plurality of cameras, the communication circuit, and the display. The at least one processor is further configured to display a preview image within the display based on first image data acquired from a first camera among the plurality of cameras, the first camera being controlled by a first parameter of an image signal processor (ISP) included in the first camera, transmit, to an external electronic device, second image data acquired from a second camera among the plurality of cameras by using the communication circuit while displaying the preview image based on the first image data, identify a second parameter for controlling the second camera at least based on the external electronic device having received the second image data, and acquire, in response to identification of a user input for capturing an image while displaying the preview image, the image corresponding to the user input by using at least one of the first camera or the second camera.

In accordance with another aspect of the disclosure, a method of an electronic device is provided. The method includes receiving, from an external electronic device, image data acquired from a camera of the external electronic device controlled based on a designated first parameter, acquiring a second parameter for controlling the camera based on the received image data, and transmitting the acquired second parameter to the external electronic device.

An electronic device and a method thereof according to the disclosure will identify a parameter to be used to control a camera at least based on an external electronic device, thereby improving the quality of an image captured in the camera of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
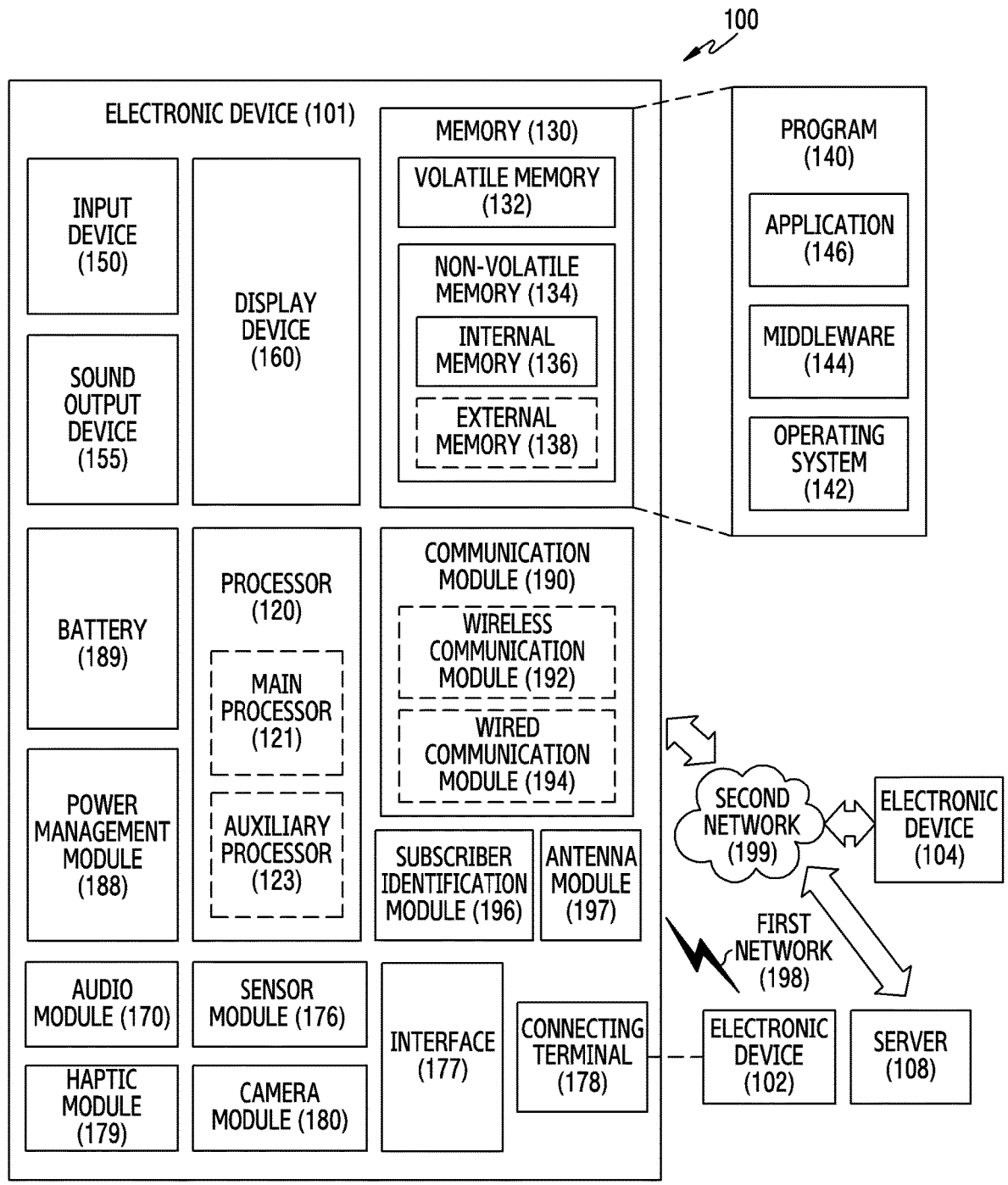
FIG. 1 is a block diagram illustrating an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expressions "have," "may have," "include," or "may include" refer to the existence of a corresponding feature (e.g., numeral, function, operation, or constituent element suh as component) and do not exclude the existence of additional features.

As used herein, the expressions "A or B," "at least one of A and/or B," or "one of more of A and/or B" may include all possible combinations of items enumerated together. For example, "A or B," "at least one of A and B," or "at least one of A or B" may refer to all of (1) including at least one A, (2) including at least one B, or (3) including all of at least one A and at least one B.

The expressions "a first," "a second," "the first," "the second," and the like as used herein may modify various elements regardless of the order and/or the importance thereof, and do not limit the corresponding elements. These expressions may be used to distinguish between one element and any other element. For example, a first element may be termed a second element, and similarly, a second element may be termed a first element without departing from the scope of the disclosure.

It should be understood that when an element (e.g., a first element) is referred to as being (operatively or communicatively) "connected," or "coupled," to another element (e.g., a second element), it may be directly connected or coupled directly to the other element, or any other element (e.g., a third element) may be interposer between them. In contrast, it could be understood that when an element (e.g., the first element) is referred to as being "directly connected," or "directly coupled" to another element (e.g., the second element), there is no element (e.g., a third element) interposed between them.

The expression "configured to" used in the disclosure may be interchangeably used with, for example, "suitable for," "having the capacity to," "designed to," "adapted to," "made to," or "capable of" according to the situation. The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g., embedded processor) only for performing the corresponding operations or a generic-purpose processor (e.g., a central processing unit (CPU) or an application processor (AP)) that can perform the corresponding operations by executing one or more software programs stored in a memory device.

The terms used in the disclosure are only used to describe specific embodiments, and are not intended to limit the disclosure. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., watch, ring, bracelet, anklet, necklace, glasses, contact lens, or head-mounted device (HMD)), a fabric or clothing-integrated type (e.g., electronic clothing), a body-mounted type (e.g., skin pad, or tattoo), and a bio-implantable type (e.g., implantable circuit).

According to some embodiments, the electronic device may include at least one of, for example, a television, a digital versatile disk (DVD) player, an audio, a refrigerator, an air conditioner, a vacuum cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to other embodiments, the electronic device may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, an automatic teller machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.).

According to some embodiments, the electronic device may include at least one of a part of furniture or a building/structure, an electronic board, an electronic signature receiving device, a projector, and various kinds of measuring instruments (e.g., water meter, electric meter, gas meter, radio wave meter, etc.). In various embodiments, the electronic device may be flexible, or may be a combination of one or more of the aforementioned various devices. Further, the electronic device according to an embodiment of the disclosure is not limited to the aforementioned devices, and may include a new electronic device according to the development of technology.

In the disclosure, the term "user" may refer to a person using an electronic device or a device (e.g., an artificial intelligence electronic device) using an electronic device.

Hereinafter, various embodiments of the disclosure will be described in detail with reference to the accompanying drawings. In the accompanying drawings, the sizes of some elements may be exaggerated or reduced for the convenience of description. For example, the size and thickness of each element are arbitrarily illustrated for the convenience of description, and thus the disclosure is not limited by the illustrated size and thickness.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a CPU or an AP), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., an international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
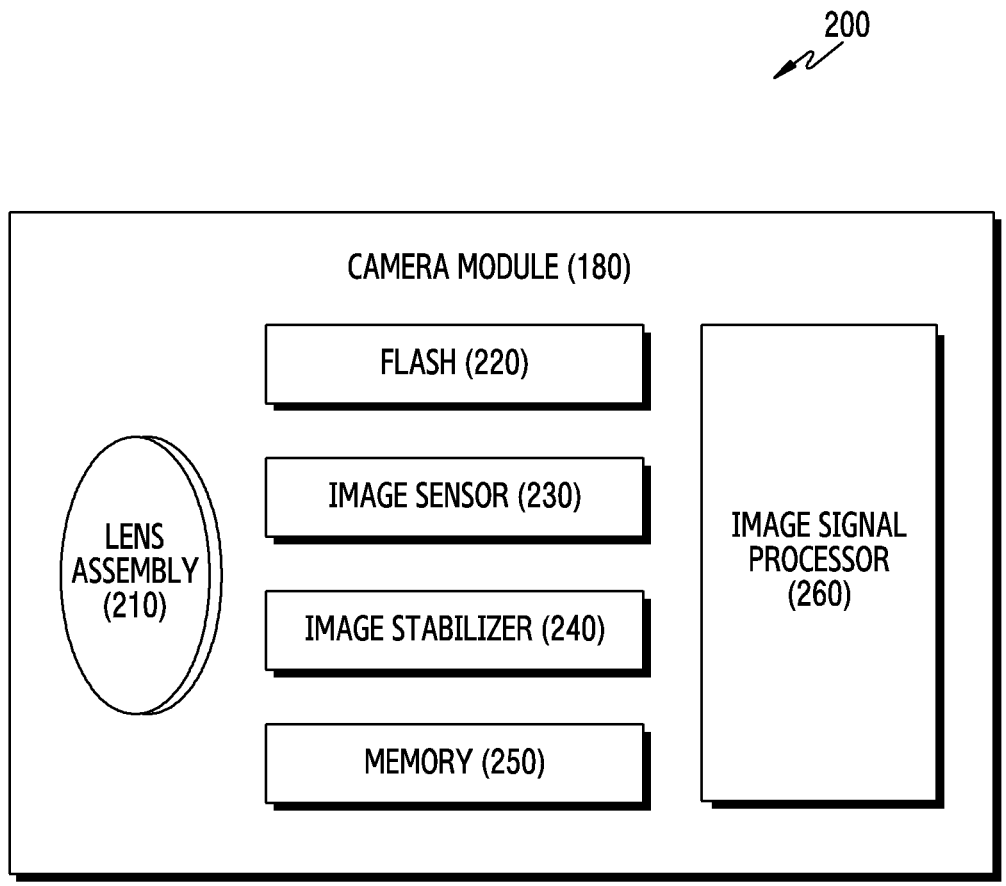
FIG. 2 is a block diagram illustrating a camera module according to an embodiment of the disclosure.

FIG. 2 is a block diagram 200 illustrating the camera module 180 according to an embodiment of the disclosure.

Referring to FIG. 2, the camera module 180 may include a lens assembly 210, a flash 220, an image sensor 230, an image stabilizer 240, memory 250 (e.g., a buffer memory), or an ISP 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, autofocusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
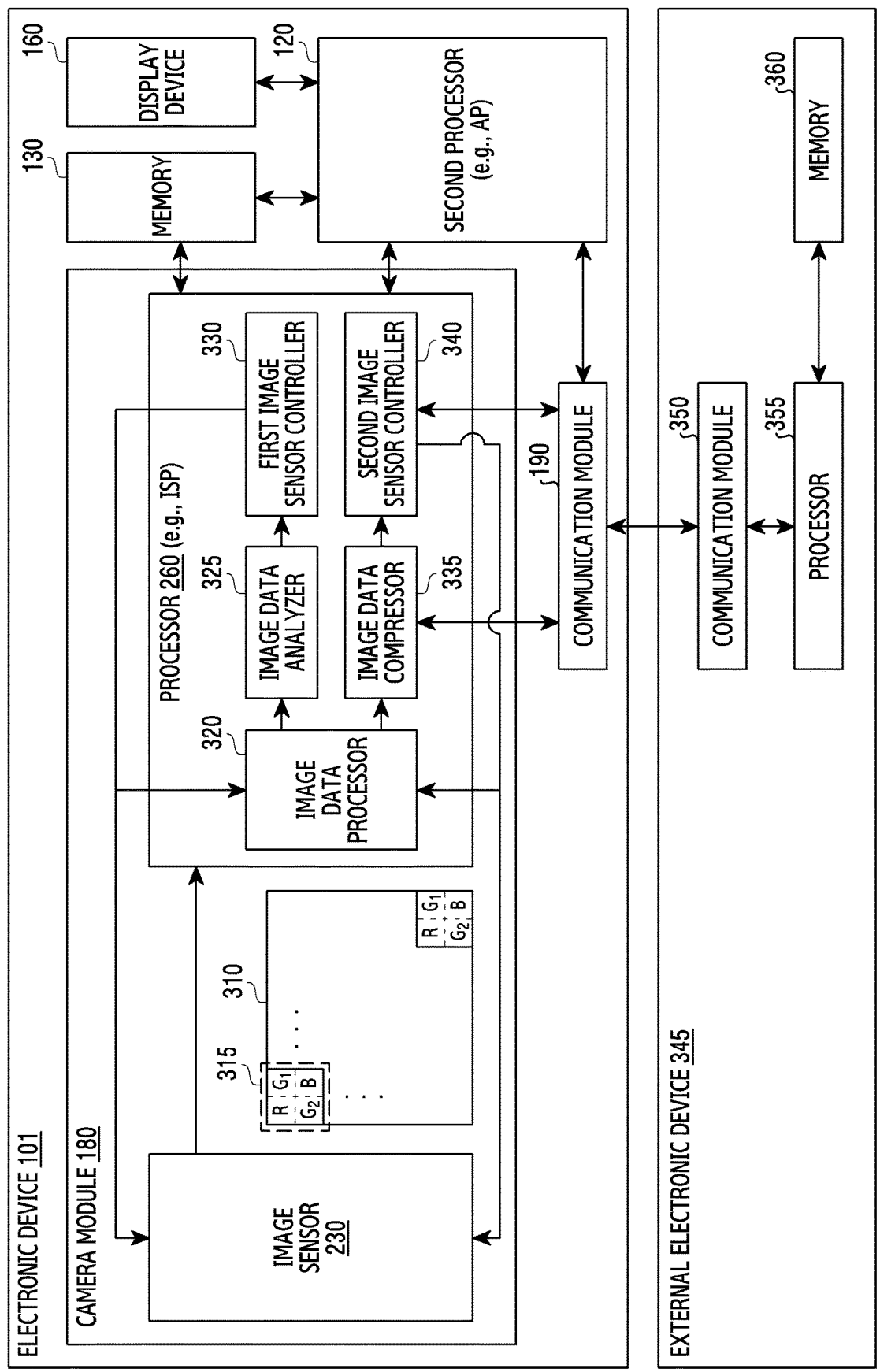
FIG. 3 is a block diagram illustrating an electronic device according to an embodiment of the disclosure.

FIG. 3 is a block diagram illustrating an electronic device according to an embodiment of the disclosure.

Referring to FIG. 3, it may correspond to the electronic device 101 of FIGS. 1 and 2. The electronic device 101 may be a smart phone, a PDA, a tablet PC such as a smart pad, a desktop PC, or a laptop PC. According to various embodiments, the electronic device 101 may be an embedded PC that may be included as a part of another electronic device, or a wearable device such as a smart watch.

The electronic device 101 may include a camera module 180 including an image sensor 230 and a processor 260. The camera module 180 may be electrically and/or operably coupled to at least one of other hardware components of the electronic device 101, for example, the second processor 120, the memory 130, the display device 160, or the communication module 190. The second processor 120 may correspond to the processor 120 (e.g., an AP) of FIG. 1. At least one of the camera module 180, the second processor 120, the memory 130, the display device 160, or the communication module 190 may be connected by an electrical interface, for example, a communication bus (not shown).

Figure 8:
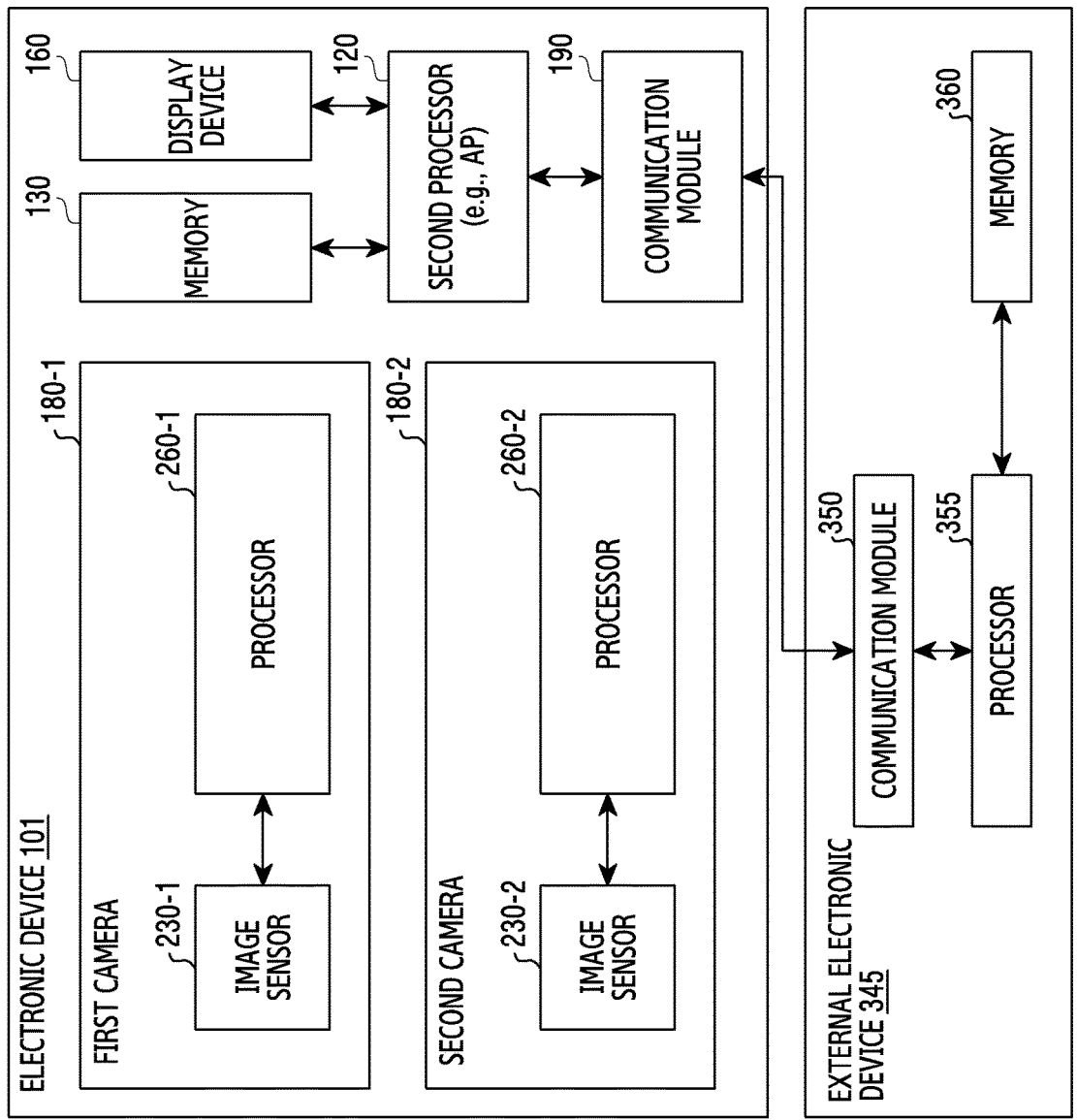
FIG. 8 is a block diagram illustrating an electronic device including a plurality of cameras according to an embodiment of the disclosure.

The image sensor 230 and the processor 260 included in the camera module 180 may correspond to the image sensor 230 of FIG. 2 and the ISP 260 of FIG. 2. Although the electronic device 101 is illustrated as including one camera module 180, the number of camera modules 180 included in the electronic device 101 may vary according to embodiments. For example, FIG. 8 illustrates an embodiment in which the electronic device 101 includes a plurality of camera modules 180. Hereinafter, the camera module 180 may be referred to as a camera. In the following description, the ISP may be referred to as the processor 260.

In an embodiment, at least a portion of the lens (e.g., the lens assembly 210 of FIG. 2) corresponding to the image sensor 230 may be exposed to the outside through the housing of the electronic device 101. External light emitted from a subject toward the lens may be propagated into the electronic device 101 and/or the camera module 180 through the lens. External light passing through the lens may arrive at the image sensor 230.

The image sensor 230 may convert an image formed on the image sensor 230 according to the external light passing through the lens into an electrical signal based on the photoelectric effect. Within the image sensor 230, a plurality of photo diodes (PDs) may be arranged in two dimensions. The plurality of PDs may convert an optical signal into an electrical signal based on the photoelectric effect. Each of the plurality of PDs may receive light (e.g., red light, blue light, and green light) of different wavelength bands and may output an electrical signal based on the intensity of the received light. Within the image sensor 230, the plurality of PDs may be arranged based on a designated pattern, such as a Bayer pattern.

The image sensor 230 may output image data 310 to the processor 260 according to a designated time point and/or period. The image data 310 may include data corresponding to the electrical signal of each of the plurality of PDs included in the image sensor 230. The plurality of electrical signals output from the plurality of PDs may be arranged in the image data 310 according to the arrangement of the plurality of PDs in the image sensor 230. Referring to FIG. 3, in a portion 315 of the image data 310, data R of a first PD receiving red light, data G1 and G2 of a second PD and a third PD receiving green light, and data B of a fourth PD receiving blue light may be arranged according to the arrangement (e.g., arrangement based on a designated pattern such as a Bayer patter) of the first PD to the fourth PD within the image sensor 230.

Referring to FIG. 3, the processor 260 according to various embodiments may receive image data from the image sensor 230. In an embodiment, the processor 260 may receive the image data 310 from the image sensor 230 every designated period (e.g., a frame per second (FPS) period adjusted from 24 Hz, 60 Hz, or 120 Hz). The processor 260 may convert the image data 310 into a form that can be used by other hardware components. For example, to store the image data 310 in the memory 130 or to convert the format of the image data 310 into a format that can be processed by the second processor 120, the processor 260 may convert the format of the image data 310 into a format based on a designated standard (e.g., the Joint Photographic Experts Group (JPEG) standard).

The processor 260 according to various embodiments may control other hardware components (e.g., the image sensor 230) included in the camera module 180. For example, the processor 260 may output at least one parameter for controlling at least one of International Organization for Standardization (ISO), shutter speed, exposure, or aperture of the camera module 180. The components and/or attributes of the camera controlled by the at least one parameter are not limited to the above example, and at least one of, for example, frame rate, white balance gain, or resolution of the image sensor 230 may be controlled by the at least one parameter.

In an embodiment, ISO may indicate the sensitivity of the image sensor 230 with respect to external light. Since the image sensor 230 may more sensitively react to external light along with an increase in the ISO, the image sensor 230 may output image data 310 having a relatively bright color. In an embodiment, the shutter speed may refer to the length of time during which the image sensor 230 receives external light. For example, the shutter speed may refer to the length of time during which a shutter included in the camera module 180 is opened. In an embodiment, exposure may be represented by a numerical value based on an exposure value (EV) and/or lux, and may indicate the amount of light of external light to which the image sensor 230 is exposed. In an embodiment, the value of the aperture may be represented by a numerical value based on an F value (i.e., a ratio of focal length/lens diameter). Here, the smaller the F value, the more external light may reach the image sensor 230.

Referring to FIG. 3, the processor 260 may include an image data processor 320, an image data analyzer 325, a first image sensor controller 330, an image data compressor 335, and/or a second image sensor controller 340 which are used for performing signal processing related to the image data 310 and/or the camera module 180. Each of the image data processor 320, the image data analyzer 325, the first image sensor controller 330, the image data compressor 335, and/or the second image sensor controller 340 may correspond to a plurality of instructions and/or threads executed in the processor 260, or may correspond to at least a portion of a circuitry for signal processing which is included in the processor 260.

In an embodiment, the processor 260 may perform image processing related to the image data 310 based on the image data processor 320. The image processing may include, for example, auto exposure (AE), auto white balance (AWB), de-mosaic, color interpolation (CI), gamma correction, edge enhancement (EE), noise reduction (NR), and/or lens shading correction (LSC).

In an embodiment, the processor 260 may identify information related to the image data 310 based on the image data analyzer 325. For example, the information may include ambient brightness information, shutter speed set by a user, exposure, ISO information, and information obtained by recognizing an external object and/or context based on image recognition. The image data analyzer 325 may identify the information from the image data 310 converted by the image data processor 320. In an embodiment, the processor 260 may identify the information related to the image data 310 based on machine learning, such as a neural network of the image data analyzer 325.

In an embodiment, the processor 260 may generate at least one parameter for controlling the image sensor 230 and/or the camera module 180 based on the first image sensor controller 330. For example, the processor 260 may input the information related to the image data 310 identified by the image data analyzer 325 to the first image sensor controller 330. The first image sensor controller 330 may generate at least one parameter for controlling the image sensor 230 and/or the camera module 180 based on at least one of, for example, the ambient brightness information, the shutter speed set by a user, the exposure, the ISO information, and the information obtained by recognizing the external object and/or context based on image recognition. Referring to FIG. 3, the parameter generated based on the first image sensor controller 330 by the processor 260 may be input to the processor 260 (e.g., the image data processor 320 in the processor 260) and/or the image sensor 230. The at least one parameter input to the processor 260 and/or the image sensor 230 may be used to control the processor 260 and/or the image sensor 230.

According to various embodiments, the electronic device 101 and/or the processor 260 may analyze the surrounding environment of the electronic device 101 at the time of acquiring the image data 310 using the image data analyzer 325. Based on the result obtained by analyzing the surrounding environment of the electronic device 101 at the above-mentioned time, the electronic device 101 and/or the processor 260 may determine at least one parameter required for controlling the image sensor 230 and/or performing image signal processing using the first image sensor controller 330.

According to various embodiments, the electronic device 101 and/or the processor 260 may acquire the image data 310 (e.g., Bayer data aligned according to a Bayer pattern) which is used to capture an image based on an external electronic device 345 independently from a processor of capturing an image using the camera module 180 (e.g., a process of capturing an image based on the image data processor 320, the image data analyzer 325, and the first image sensor controller 330). The external electronic device 345 may provide information used to determine parameters for controlling the camera module 180. The image data 310 to be used for capturing an image based on the external electronic device 345 may be processed, for example, by the image data compressor 335.

According to various embodiments, the processor 260 may convert the image data 310 processed by the image data processor 320 and/or the image data 310 received from the image sensor 230 into a format for outputting the image data 310 to the external electronic device 345 using the communication module 190, based on the image data compressor 335. For example, the processor 260 may compress and/or package the image data 310. The image data 310 which is compressed by the processor 260 based on the image data compressor 335 may be related to a pattern in which a plurality of PDs are arranged in the image sensor 230, such as a Bayer pattern. For example, electrical signals of each of the plurality of PDs in the image data 310 may be arranged along a pattern in which the plurality of PDs are arranged.

According to various embodiments, the processor 260 may transmit the image data 310 converted based on the image data compressor 335 to the external electronic device 345 different from the electronic device 101 using the communication module 190. The communication module 190 may include, for example, at least one of a communication modem and/or communication circuit. The electronic device 101 may establish a connection for transmitting or receiving data to or from the external electronic device 345 different from the electronic device 101 using the communication module 190. The external electronic device 345 may be connected to one or more clients including the electronic device 101 using a network (e.g., the Internet). For example, the electronic device 101 may correspond to a client receiving a service provided by the external electronic device 345, and the external electronic device 345 may correspond to a server providing the service. The service provided by the external electronic device 345 may include, for example, a service for analyzing and/or processing the image data 310 obtained from the electronic device 101, such as in a cloud camera.

According to various embodiments, the external electronic device 345 may be connected to the network and/or the electronic device 101 using the communication module 350. The external electronic device 345 may include the communication module 350, one or more processors 355, and/or at least one memory 360. The external electronic device 345 may receive the image data 310 (e.g., the image data 310 converted based on the image data compressor 335 of the processor 260) from the electronic device 101. The processor 355 of the external electronic device 345 may process the image data 310 received from the electronic device 101 to obtain information related to the image data 310.

In an embodiment, the processor 355 may identify ambient brightness information, shutter speed set by a user, exposure, ISO information, and information obtained by recognizing an external object and/or context based on image recognition, as information related to the image data 310. For example, the information related to the image data 310 acquired by the processor 355 may include at least one of information obtained by recognizing an external object included in the image data 310, information for segmenting an external object, information indicating the depth of the image data 310, information indicating preference of the user of the electronic device 101, contextual information related to a geographic location corresponding to the image data 310 (e.g., weather information and/or contextual information of the geographic location), information about a person included in the image data 310 (e.g., relationship information between the person and the user of the electronic device 101), subscription information of the user of the electronic device 101, information indicating the state of the external electronic device 345, or information indicating the state of the electronic device 101.

In an embodiment, the information related to the image data 310 acquired by the processor 355 may be results obtained by analyzing the image data 310, and may include, for example, information of a plurality of external objects (e.g., a primary external object and/or a secondary external object) included in the image data 310, information about a region where the image data 310 is acquired, information related to similarity with other image data stored (e.g., scrapped) by the user of the electronic device 101, and information related to similarity with other image data captured by the user of the electronic device 101 in the past (e.g., similarity of pose, similarity of time, and/or similarity of place). The information related to the image data 310 acquired by the processor 355 may include information that cannot be acquired by the processor 260 of the electronic device 101.

In an embodiment, the information related to the image data 310 acquired by the processor 355 of the external electronic device 345 and information related to the image data 310 acquired based on the image data analyzer 325 by the processor 260 of the electronic device 101 may commonly include the information obtained by recognizing the external object included in the image data 310. The processor 355 of the external electronic device 345 may more accurately identify information related to the image data 310 based on, for example, a neural network having a deeper level than a neural network of the image data analyzer 325.

The processing power of the processor 355 of the external electronic device 345 may be higher than the processing power of the processor 260 of the electronic device 101. In addition, the external electronic device 345 may acquire information having more types and higher dimensions than information acquired from the image data 310 based on the image data analyzer 325 by the processor 260. For example, the information related to the image data 310 acquired by the external electronic device 345 may further include information that cannot be acquired by the processor 260 of the electronic device 101, for example, based on the image data analyzer 325, such as information for segmenting an external object, information indicating the depth of the image data 310, information indicating preference of the user of the electronic device 101, and contextual information related to a geographic location corresponding to the image data 310.

According to various embodiments, the external electronic device 345 may store the information related to the image data 310 identified using the processor 355 in the memory 360 or may transmit the same to the electronic device 101 using the communication module 350. The information related to the image data 310 transmitted to the electronic device 101 by the external electronic device 345 may be processed by the processor 260. In an embodiment, the processor 260 may generate at least one parameter for controlling the image sensor 230 and/or the camera module 180 based on the information related to the image data 310 received from the external electronic device 345, based on the second image sensor controller 340. In an embodiment, the processor 260 may generate the at least one parameter using both the information received from the external electronic device 345 using the second image sensor controller 340 and the information acquired based on the image data analyzer 325. The at least one parameter may be used to control the processor 260, the image sensor 230, and/or the camera module 180.

In an embodiment, at least one parameter generated based on the second image sensor controller 340 by the processor 260 may be a parameter for controlling at least one of an ISO, shutter speed exposure, or aperture of the camera module 180. The second image sensor controller 340 may generate the at least one parameter based on information received from the external electronic device 345. The at least one parameter generated by the second image sensor controller 340 may capture a higher quality image compared to when capturing an image using the at least one parameter generated by the first image sensor controller 330.

In an embodiment, the image data 310 processed by the processor 260 may be used by other hardware components (e.g., the second processor 120 and/or the memory 130) inside the electronic device 101 different from the camera module 180. For example, the second processor 120 may display the image data 310 processed by the processor 260 on a display of the display device 160. For example, the second processor 120 may store the image data 310 processed by the processor 260 in the memory 130. Hereinafter, a user interface (UI) displayed on the display of the display device 160 by the electronic device 101 according to various embodiments will be described with reference to FIGS. 4A to 4C.

Figure 4A:
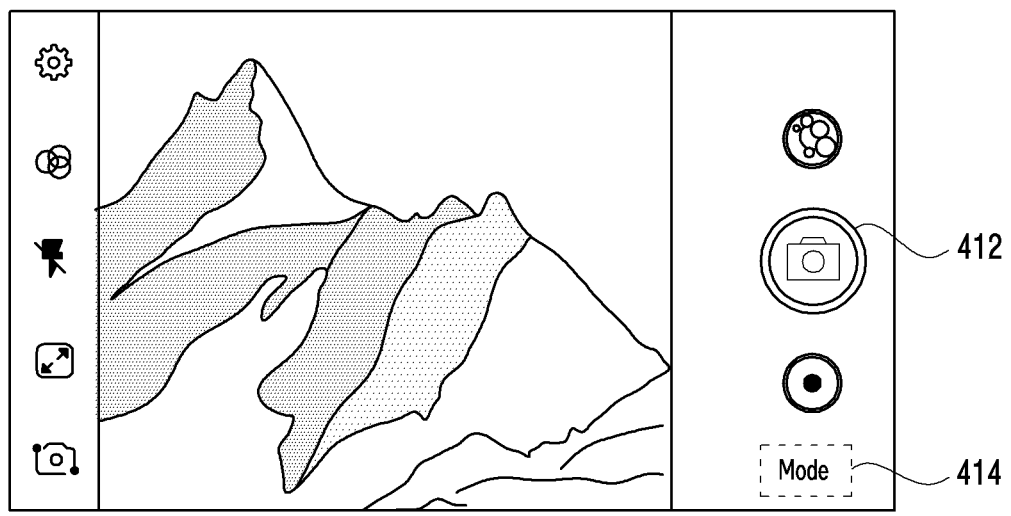
FIG. 4A is a diagram illustrating a user interface (UI) displayed by an electronic device according to an embodiment of the disclosure.

FIG. 4A is a diagram illustrating a UI 410 displayed by an electronic device according to an embodiment of the disclosure.

Figure 4B:
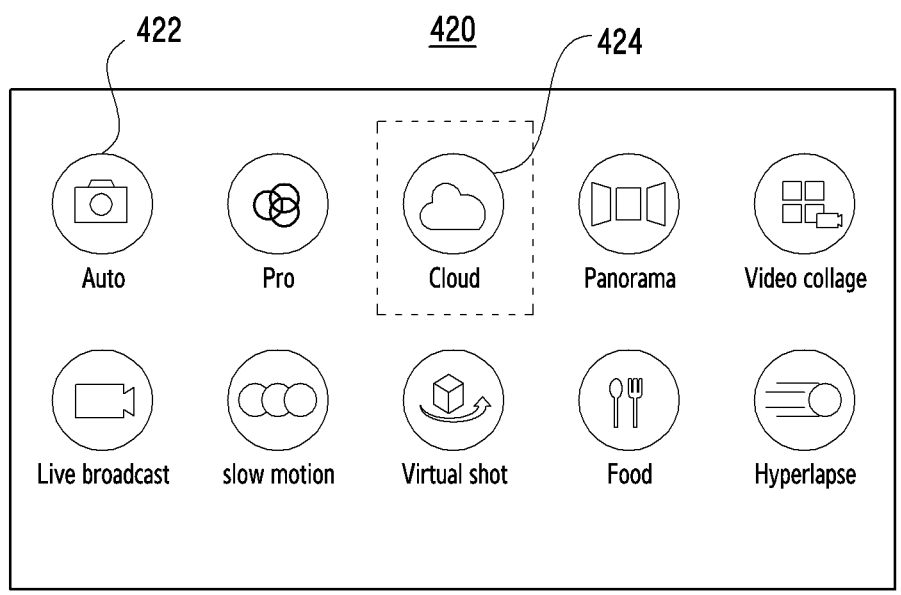
FIG. 4B is a diagram illustrating a UI displayed by an electronic device according to an embodiment of the disclosure.

FIG. 4B is a diagram illustrating a UI 420 displayed by an electronic device according to an embodiment of the disclosure.

Figure 4C:
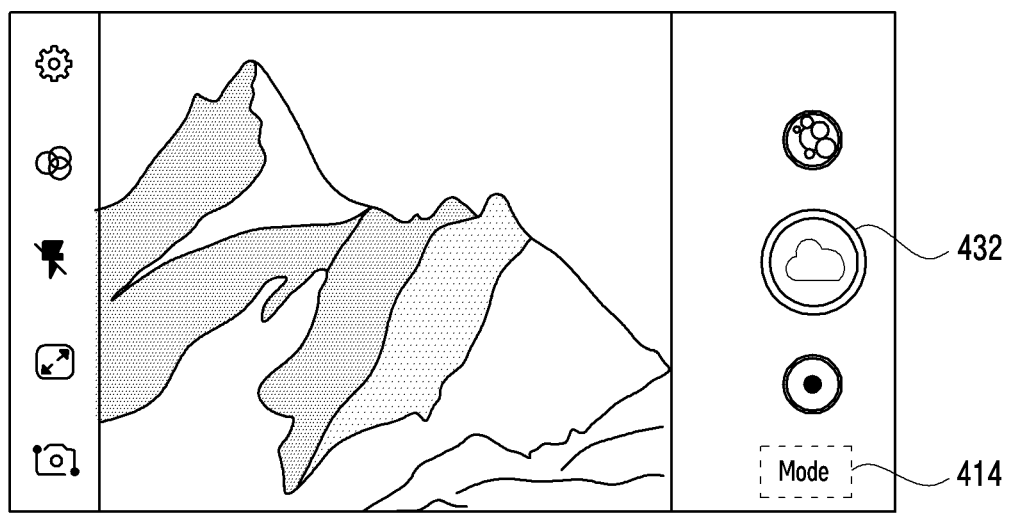
FIG. 4C is a diagram illustrating a UI displayed by an electronic device according to an embodiment of the disclosure.

FIG. 4C is a diagram illustrating a UI 430 displayed by an electronic device according to an embodiment of the disclosure. The electronic device of FIGS. 4A to 4C may correspond to the electronic device 101 of FIGS. 1 to 3. The UIs 410, 420, and 430 of FIGS. 4A to 4C may be displayed in the display device 160 (e.g., a display such as a touch screen) of the electronic device 101 of FIG. 1 or 3.

The electronic device according to various embodiments may output at least one of the UIs 410, 420, and 430 of FIGS. 4A to 4C in response to a user input for executing an application (e.g., the application 146 of FIG. 1) related to a camera. For example, the electronic device may display the UI 410 of FIG. 4A on the display in response to the user input. Referring to FIG. 4A, the electronic device may display a preview image based on at least a portion of image data acquired from a camera (e.g., the camera module 180 of FIGS. 2 and 3) in the UI 410. The electronic device may display at least one visual element superimposed on the preview image in the UI 410.

Referring to FIG. 4A, the visual element superimposed and displayed on the preview image by the electronic device may include an icon 412 for capturing an image. The electronic device according to an embodiment may capture an image based on image data obtained from the camera in response to a user input for capturing an image. The user input for capturing an image may correspond to at least one of, for example, a user input for touching the icon 412, a user input for pressing a designated button exposed to the outside through the housing of the electronic device, a user input including a gesture performed separately from the electronic device, or a user input for inputting a voice signal including a voice command (e.g., "Take a picture"). Capturing an image may mean synthesizing or combining at least one image data obtained from at least one viewpoint to generate at least one image file and/or video file.

The electronic device according to an embodiment may capture an image using the processor 260 of FIG. 3 in response to the user input for capturing an image. Hereinafter, a designated first state may refer to a state in which the electronic device captures the image while does not receive information from an external electronic device (e.g., the external electronic device 345 of FIG. 3) different from the electronic device when the electronic device captures the image. For example, the UI 410 of FIG. 4A may be a UI displayed by the electronic device in the first state. In the first state, at least one of the ISO, shutter speed, exposure, or aperture of the camera of the electronic device may be controlled by the processor 260 of FIG. 3 and/or the first image sensor controller 330. For example, in the first state, the electronic device may cease or deactivate the operation of the image data compressor 335 and the second image sensor controller 340 of FIG. 3.

Hereinafter, a designated second state different from the first state may refer to a state in which the electronic device captures the image at least based on information received from the external electronic device. In the second state, at least one of the ISO, shutter speed, exposure, or aperture of the camera of the electronic device may be controlled by the processor 260 of FIG. 3 that has received information transmitted from the external electronic device 345 of FIG. 3 and/or the second image sensor controller 340.

The visual element that is displayed to be superimposed on the preview image by the electronic device according to an embodiment may include a button 414 for switching the state of the electronic device between the first state and the second state. Referring to FIG. 4A, to intuitionally indicate that the button 414 is related to a function for switching a state (to intuitionally indicate), the button 414 may include a designated text (e.g., "MODE").

In an embodiment, in response to a user input for touching the button 414, the electronic device may display a menu for switching a state, such as the UI 420 of FIG. 4B. The UI 420 may be displayed translucently on the preview image, or may be displayed in the form of a window occluding the preview image. The electronic device may include an icon 422 for entering the first state and an icon 424 for entering the second state in the UI 420. Referring to FIG. 4B, icons displayed in the UI 420 by the electronic device may include icons corresponding to various photographing modes related to the camera (e.g., panorama, video collage, live broadcast, slow motion, virtual shot, food photo, hyper Labs, etc.). In an embodiment, the electronic device may display the color and/or shape of an icon (e.g., the icon 422) corresponding to a current state and/or a current photographing mode among the plurality of icons, differently from the colors and/or shapes of other icons.

In an embodiment, in response to the user input for entering the second state, the electronic device may display a UI for capturing an image using an external electronic device, such as the UI 430 of FIG. 4C. The user input for entering the second state may include at least one of a user input for touching the icon 424 within the UI 420 of FIG. 4B, a user input for inputting a designated button exposed to the outside through the housing of the electronic device, a user input including a gesture performed separately from the electronic device, or a user input for inputting a voice signal including a voice command (e.g., "Turn on cloud camera"). In response to the user input for entering the second state, the electronic device may initiate or activate the operation of the image data compressor 335 and the second image sensor controller 340 of FIG. 3.

Referring to FIG. 4C, the electronic device may display at least one visual element superimposed on the preview image. The visual element may include an icon 432 for capturing an image based on an external electronic device and/or a button 414 for switching the state of the electronic device to another state (e.g., first state) different from the second state. The icon 432 may intuitively display, to the user, the fact that the electronic device operates based on the second state, while including an image (e.g., an image corresponding to the cloud) different from the icon 412 of FIG. 4A.

The electronic device according to various embodiments may capture an image at least based on an external electronic device different from the electronic device, in response to a user input (e.g., the user input for touching the icon 432) for capturing an image based on the second state. In an embodiment, the external electronic device may generate a parameter for controlling the camera of the electronic device and/or information related to the parameter. In an embodiment, the external electronic device may generate information for enhancing the quality of image data obtained from the camera of the electronic device. The parameter and/or the information generated by the external electronic device may be transmitted to the electronic device.

Figure 5:
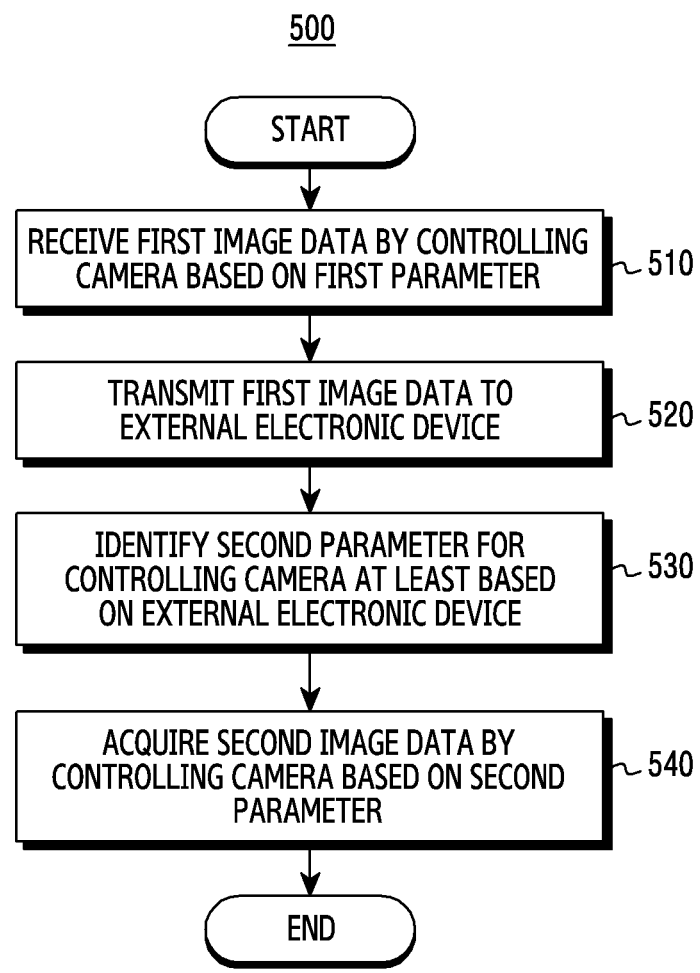
FIG. 5 is a flowchart illustrating operations of an electronic device according to an embodiment of the disclosure.

FIG. 5 is a flowchart 500 illustrating operations of an electronic device according to an embodiment of the disclosure. The electronic device of FIG. 5 may correspond to the electronic device 101 of FIGS. 1 to 3. The operation of the electronic device of FIG. 5 may be performed, for example, by at least one of the electronic device 101 of FIGS. 1 to 3, the ISP 260 of FIG. 2, or the processor 260 of FIG. 3.

Referring to FIG. 5, in operation 510, an electronic device according to various embodiments may receive first image data from a camera by controlling the camera based on a first parameter. In an embodiment, the electronic device may perform operation 510 in response to a user input for executing a designated application (e.g., a camera application) related to the camera. The first parameter may be a parameter for controlling at least one of ISO, shutter speed, exposure, or aperture of the camera. The first parameter may be based on information identified from the first image data (e.g., information for identifying or extracting an external object related to the first image data).

In an embodiment, the electronic device may identify and/or adjust the first parameter based on image data based on a designated pattern (e.g., a Bayer pattern) of a plurality of PDs received from an image sensor. For example, the electronic device may obtain the first parameter used to control the camera, based on the processor 260 of FIG. 3 (e.g., the image data processor 320, the image data analyzer 325, and/or the first image sensor controller 330 of the processor 260). In a state in which the camera is controlled based on the first parameter, the electronic device according to an embodiment may receive the first image data from the camera every designated period (e.g., FPS period).

Referring to FIG. 5, in operation 520, the electronic device according to various embodiments may transmit the first image data to an external electronic device. The electronic device according to an embodiment may transmit the first image data to the external electronic device different from the electronic device by using a communication circuit such as the communication module 190 of FIG. 3. The first image data transmitted to the external electronic device may be data in which signals of a plurality of photodiodes included in the image sensor of the camera are aligned based on a pattern of a plurality of photodiodes within the image sensor. In an embodiment, the electronic device may compress or package the first image data and transmit it to the external electronic device.

In order to transmit the first image data, the electronic device according to an embodiment may be connected to the external electronic device before and after receiving the first image data from the camera. For example, in response to a user input for executing a designated application related to the camera (e.g., a camera application), the electronic device may establish a connection with the external electronic device. In an embodiment, in response to a user input for switching the state of the electronic device and/or the camera to a state (e.g., a second state) for capturing the image at least based on information received from the external electronic device, the electronic device may establish the connection with the external electronic device. The user input may include, for example, a user input for touching the icon 424 of FIG. 4B. The external electronic device may correspond to, for example, at least one server for providing a cloud camera service to the electronic device.

In an embodiment, the external electronic device may perform image recognition based on the first image data. In an embodiment, the first parameter used to receive the first image data may be a parameter designated for performing image recognition of the external electronic device. The external electronic device may acquire information related to the first image data at least based on the image recognition. For example, based on the image recognition, the external electronic device may acquire at least one of information obtained by recognizing an external object from the first image data, information for segmenting an external object, information about a person included in the image data, or information indicating a distance (e.g., depth) between the external object included in the image data 310 and the electronic device. For example, the external electronic device may acquire at least one of information indicating preference of the user of the electronic device, contextual information related to a geographic location corresponding to the image data (e.g., weather information and/or contextual information of the geographic location), subscription information of the user of the electronic device, information indicating the state of the external electronic device, or information indicating the state of the electronic device, as information related to the electronic device and/or the external electronic device. The external electronic device may transmit at least one of the acquired information to the electronic device in response to acquiring the information related to the first image data.

Referring to FIG. 5, in operation 530, the electronic device according to various embodiments may identify a second parameter for controlling the camera, at least based on the external electronic device. In an embodiment, at least based on the external electronic device that has received the first image data, the electronic device may identify the second parameter for controlling the camera. The second parameter may be distinct from the first parameter of operation 510. The second parameter may be, for example, a parameter for controlling at least one of the ISO, shutter speed, exposure, or aperture of the camera. The second parameter may include a numerical value for controlling at least one of the ISO, shutter speed, exposure, or aperture of the camera differently from the first parameter.

In an embodiment, the external electronic device, which receives the first image data and is associated with the identification of the second parameter by the electronic device, may have processing power equal to or greater than the processing power of the electronic device. For example, the computation speed, computation power, and/or processing power of the external electronic device may be higher than those of the electronic device. For example, the external electronic device is a hardware component for processing image data, and may include a hardware component which is not included in the electronic device and/or a hardware component superior to the hardware component included in the electronic device. For example, in an embodiment of FIG. 3, the processor 355 of the external electronic device 345 may have more cores or a faster computation speed than the processor 260 and/or the second processor 120 of the electronic device 101. The electronic device according to an embodiment may communicate with an external electronic device having a faster computation speed than the electronic device in order to improve the quality of the image data obtained from the camera.

The electronic device according to an embodiment may receive information related to the first image data from the external electronic device after transmitting the first image data based on operation 520. For example, the electronic device may receive, from the external electronic device, at least one of information for identifying an external object included in the first image data (e.g., information including a result obtained by recognizing the external object), information based on the location of the first image data, or information based on the state of the electronic device and the external electronic device. In an embodiment, the electronic device may identify the second parameter based on the received information. The second parameter may be configured to improve the quality of the image data obtained from the camera.

In an embodiment, at least one of an operation of acquiring the first image data based on operation 510 by the electronic device, an operation of transmitting the first image data based on operation 520, or an operation of identifying the second parameter based on operation 530 may be performed while the electronic device displays a preview image (e.g., the preview image within the UI 430 of FIG. 4C) on the display. In an embodiment, the electronic device may receive image data related to the preview image from the camera by controlling the camera based on a designated third parameter different from the first parameter and/or the second parameter. In response to the reception of the image data related to the preview image, the electronic device may display the preview image on the display based on at least a portion of the image data. An operation of receiving the first image data to be transmitted to the external electronic device using the first parameter by the electronic device and an operation of receiving another image data to be used to display the preview image using the third parameter may be sequentially performed at a designated period and/or at different time points. The operations sequentially performed based on the first parameter and the third parameter by the electronic device will be described in detail with reference to FIG. 6.

Referring to FIG. 5, in operation 540, the electronic device according to various embodiments may acquire second image data by controlling the camera based on the second parameter. In an embodiment, in response to the identification of the second parameter based on operation 530, the electronic device may acquire the second image data from the camera by controlling the camera based on the second parameter. For example, the electronic device may acquire the second image data from the camera by controlling at least one of the sensitivity, shutter speed, exposure, or aperture of the camera according to the second parameter.

The electronic device according to an embodiment may acquire the second image data based on operation 540, in response to receiving a user input for capturing an image (e.g., a user input for touching the shutter-shaped icon 432 of FIG. 4C) after identifying the second parameter based on operation 530. In an embodiment, the electronic device may display the preview image on the display based on the second image data acquired by controlling the camera based on the second parameter.

Since the second parameter is configured to improve the quality of the image data obtained from the camera, the quality of the second image data may be quality that is improved than the quality of the first image data and the quality of another image data acquired based on the third parameter. When the external electronic device has higher processing power than the electronic device, the quality of the second image data obtained using the second parameter identified at least based on the external electronic device may be improved than the quality of another image data obtained while the electronic device does not communicate with the external electronic device.

Figure 6:
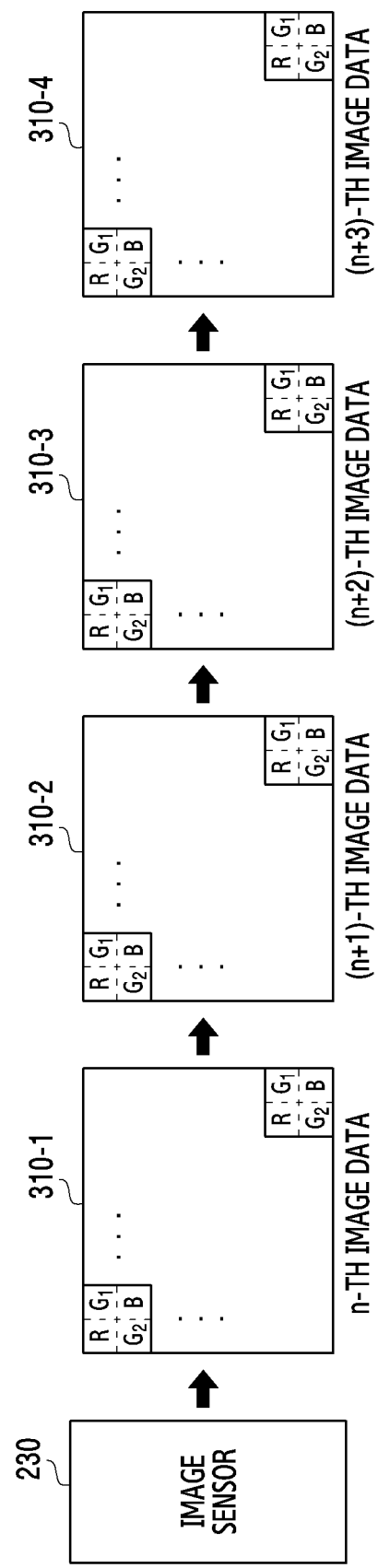
FIG. 6 is a diagram illustrating an operation in which an electronic device receives a plurality of pieces of image data from an image sensor according to an embodiment of the disclosure.

FIG. 6 is a diagram illustrating an operation in which an electronic device receives a plurality of pieces of image data 310-1, 310-2, 310-3, and 310-4 from the image sensor 230 according to an embodiment of the disclosure. The electronic device of FIG. 6 may correspond to the electronic device 101 of FIGS. 1 to 3. The image sensor 230 of FIG. 6 may correspond to the image sensor 230 of FIGS. 2 and 3. The image sensor 230 may be controlled by the electronic device 101 of FIGS. 1 to 3, the ISP 260 of FIG. 2, and/or the processor 260 of FIG. 3.

In an embodiment, the image sensor 230 may output image data every designated period. Each image data output every period may correspond to a frame output from the image sensor 230.

Referring to FIG. 6, in each of the plurality of pieces of image data 310-1, 310-2, 310-3, 310-4 output from the image sensor 230 every designated period, a plurality of values (e.g., brightness values of designated colors measured in the plurality of PDs and corresponding to the plurality of PDs, respectively) based on electrical signals acquired from each of the plurality of PDs included in the image sensor 230 may be stored. Within the image data, the plurality of values may be arranged according to the arrangement of the plurality of PDs (e.g., a designated pattern such as a Bayer pattern).

In an embodiment, the electronic device may receive a plurality of pieces of image data 310-1, 310-2, 310-3, and 310-4 every designated period by controlling the camera based on parameters that are distinct from each other every designated period. For example, the electronic device may control at least one of the ISO, shutter speed, exposure, or aperture of the camera based on the parameters. The electronic device may control the camera based on different parameters every designated period, and the image sensor 230 may output the plurality of pieces of image data 310-1, 310-2, 310-3, and 310-4 having different qualities every designated period. The parameter used to control the camera may be changed every designated period, or may be maintained at a constant value.

In FIG. 6, an n-th image data 310-1, an (n+1)-th image data 310-2, an (n+2)-th image data 310-3, and an (n+3)-th image data 310-4 which are sequentially output according to the designated period from the image sensor 230 are illustrated. In an embodiment, the electronic device may use at least one of the plurality of pieces of image data 310-1, 310-2, 310-3, and 310-4 to display the preview image. Among the remaining image data except at least one of the plurality of pieces of image data 310-1, 310-2, 310-3, and 310-4 used to display the preview image, the electronic device may select the image data to be transmitted to the external electronic device.

In an embodiment, the electronic device may sequentially receive the plurality of pieces of image data 310-1, 310-2, 310-3, and 310-4 corresponding to a plurality of designated parameters (e.g., a first parameter used to acquire the image data to be transmitted to the external electronic device and a third parameter used to acquire the preview image) by sequentially using the plurality of parameters every designated period. For example, the processor 260 of FIG. 3 may sequentially receive the plurality of pieces of image data 310-1, 310-2, 310-3, and 310-4 from the image sensor 230 by controlling the camera module 180 sequentially using the plurality of designated parameters based on the second image sensor controller 340. The period in which the electronic device sequentially uses the plurality of designated parameters may be adjusted, for example, based on the second image sensor controller 340 by the processor 260 of FIG. 3.

For example, the electronic device may receive the n-th image data 310-1 and the (n+2)-th image data 310-3 from the image sensor 230 by controlling the camera based on the designated parameter (e.g., the third parameter) related to the preview image in an n-th period and an (n+2)-th period. The electronic device (e.g., the processor 260 and/or the second processor 120 in FIG. 3) that has received the n-th image data 310-1 and the (n+2)-th image data 310-3 may display the preview image on the display based on at least a portion of the n-th image data 310-1 and the (n+2)-th image data 310-3. For example, the electronic device may display, on the display, the preview image having a resolution smaller than the resolution of each of the n-th image data 310-1 and the (n+2)-th image data 310-3.

For example, the electronic device may receive the (n+1)-th image data 310-2 and the (n+3)-th image data 310-4 from the image sensor 230 by controlling the camera based on a designated parameter (e.g., the first parameter) related to the external electronic device in an (n+1)-th period and an (n+3)-th period. The electronic device (e.g., the processor 260 of FIG. 3) that has received the (n+1)-th image data 310-2 and the (n+3)-th image data 310-4 may transmit at least one of the (n+1)-th image data 310-2 and the (n+3)-th image data 310-4 to the external electronic device, for example, based on operation 520 of FIG. 5. In an embodiment, the electronic device may transmit at least one of the (n+1)-th image data 310-2 or the (n+3)-th image data 310-4 to the external electronic device based on compression and/or packaging.

In an embodiment, each of a parameter used by the electronic device in the n-th period and the (n+2)-th period and used to acquire the preview image and a parameter used in the (n+1)-th period and the (n+3)-th period and used to acquire the image data to be transmitted to the external electronic device may control the camera differently as shown in Table 1.

TABLE 1

| | Parameter used to acquire preview image (e.g., parameter used in n-th period and (n + 2)-th period) | Parameter used to acquire image data to be transmitted to external electronic device (e.g., parameter used in (n + 1)-th period and (n + 3)-th period) |
| --- | --- | --- |
| ISO | Adjusted based on amount of external light reaching image sensor 230 | Designated ISO sensitivity (e.g., set to a higher value than ISO sensitivity for obtaining preview image) |
| Shutter speed | Adjusted based on amount of external light | Designated shutter speed (e.g., set to be faster than shutter speed for obtaining preview image) |
| Exposure | Acquire plurality of pieces of image data with different exposures | set to exposure value (EV) for minimizing saturation region |
| Aperture | Adjusted based on amount of external light and/or user's selection | Designated F value (e.g., maximum F value) |

Referring to Table 1, the saturation region may refer to a region displayed with maximum brightness in the image data as at least one of the plurality of PDs included in the image sensor 230 is sensitive to the external light. The electronic device may use at least one of different ISOs, shutter speeds, exposures, or apertures to receive each of the image data to be used to acquire the preview image (e.g., n-th image data 310-1 and (n+2)-th image data 310-3) and the image data to be used for image recognition of the external electronic device (e.g., (n+1)-th image data 310-2 and (n+3)-th image data 310-4). The electronic device may acquire another image data optimized for image recognition of the external electronic device while acquiring the image data optimized for acquiring the preview image.

In an embodiment, the electronic device may transmit the image data optimized for image recognition of the external electronic device to the external electronic device. In addition, the electronic device may enhance the quality of an image captured from the camera using the external electronic device by controlling the camera based on information related to the image data transmitted from the external electronic device. Hereinafter, with reference to FIG. 7, an operation in which an electronic device according to an embodiment enhances the quality of an image captured from the camera using an external electronic device will be described in detail.

Figure 7:
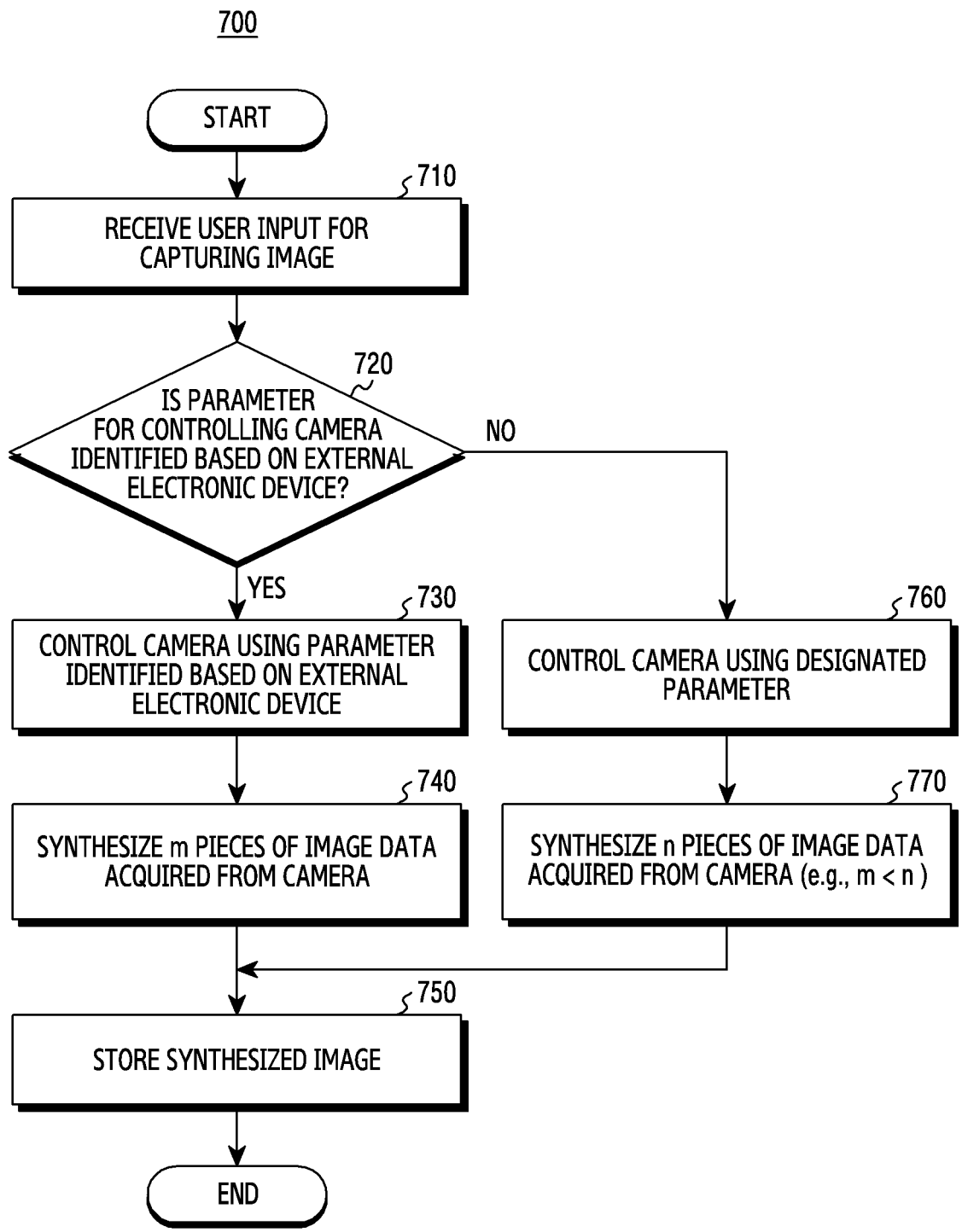
FIG. 7 is a flowchart illustrating an operation performed by an electronic device in response to reception of a user input for capturing an image according to an embodiment of the disclosure.

FIG. 7 is a flowchart 700 illustrating an operation performed by an electronic device in response to reception of a user input for capturing an image according to an embodiment of the disclosure. The electronic device of FIG. 7 may correspond to the electronic device 101 of FIGS. 1 to 3. The operation of the electronic device of FIG. 7 may be performed, for example, by at least one of the electronic device 101 of FIGS. 1 to 3, the ISP 260 of FIG. 2, or the processor 260 of FIG. 3. At least one of the operations of FIG. 7 may be performed in association with or similar to at least one of the operations of FIG. 5.

Referring to FIG. 7, in operation 710, the electronic device according to various embodiments may receive a user input for capturing an image. The user input for capturing an image may include, for example, a user input for touching the icon 412 of FIG. 4A and/or the icon 432 of FIG. 4C. The image captured by the electronic device in response to the user input may be an image (e.g., a high dynamic range (HDR) image) obtained by synthesizing a plurality of pieces of image data obtained from an image sensor at different viewpoints. The user input may be received in a state in which information related to the image data is received from an external electronic device based on, for example, the operations of FIG. 5. The user input may be received in a state in which the camera is controlled based on different parameters, for example, as shown in FIG. 6.

Referring to FIG. 7, in operation 720, the electronic device according to various embodiments may determine whether a parameter for controlling the camera is identified based on the external electronic device. In an embodiment, based on operation 520 of FIG. 5, the electronic device may receive the information related to the image data from the external electronic device or may identify the parameter for controlling the camera based on the information (e.g., the second parameter of operation 520). In an embodiment, the electronic device may determine whether to receive information for controlling the camera from the external electronic device. The parameter for controlling the camera may include a numerical value for controlling at least one of ISO, shutter speed, exposure, or aperture of the camera (e.g., ISO sensitivity, shutter speed value, EV, or F value).

When the parameter for controlling the camera is identified based on the external electronic device in operation 720-YES, in operation 730, the electronic device according to various embodiments may use the parameter identified based on the external electronic device to control the camera. In an embodiment, the electronic device may control the camera based on information received from the external electronic device. In response to controlling the camera using the parameter identified based on the external electronic device, the electronic device according to various embodiments may receive m pieces of image data from the camera. In operation 740, the electronic device according to various embodiments may synthesize the m pieces of image data obtained from the camera. Referring to FIG. 7, in operation 750, the electronic device according to various embodiments may store the synthesized image (e.g., an HDR image obtained by synthesizing the m pieces of image data). The image may be stored in, for example, the memory 130 of FIG. 3.

In response to receiving a user input for capturing an image according to operation 710 in a designated second state in which the second parameter is identified at least based on the external electronic device according to operation 530 of FIG. 5, the electronic device according to an embodiment may capture an image based on a plurality of pieces of image data (e.g., m pieces of image data) obtained by controlling the camera based on the second parameter.

When the parameter for controlling the camera is not identified based on the external electronic device in operation 720-NO, in operation 760, the electronic device according to various embodiments may control the camera using a designated parameter. The designated parameter may be, for example, a parameter pre-stored in the electronic device to capture an HDR image. In response to controlling the camera using the designated parameter, the electronic device may receive n pieces of image data from the camera. In operation 770, the electronic device according to various embodiments may synthesize the n pieces of image data obtained from the camera. The electronic device may store the HDR image obtained by synthesizing the n pieces of image data based on operation 750.

In response to receiving the user input for capturing an image according to operation 710 in a designated first state that is distinct from the second state, the electronic device according to an embodiment may capture the image based on the plurality of pieces of image data (e.g., n pieces of image data) obtained by controlling the camera based on the designated parameter. The parameter identified based on the external electronic device of operation 730 and the designated parameter of operation 760 may be configured to control the camera differently, as shown in Table 2.

TABLE 2

| | Designated parameter (e.g., parameter for capturing HDR image pre-stored in electronic device) | Parameter identified based on external electronic device |
|---|---|---|
| ISO sensitivity | 200 | 400 |
| Shutter speed | 1/20 seconds | 1/100 seconds |
| Exposure | Acquire designated pieces of image data with long-exposure, Acquire designated pieces of image data with medium-exposure Acquire designated pieces of image data with low-exposure Acquire total of n pieces of image data) | Acquire image data using exposure value for minimizing saturation region |
| Aperture | F1.5 | F2.4 |

Referring to operations 740 and 770, the number of the plurality of pieces of image data acquired to capture an image corresponding to the user input, such as an HDR image, may vary according to the parameter controlling the camera. For example, the number (m) of pieces of image data received from the camera in a state in which the electronic device controls the camera based on the parameter identified based on the external electronic device (e.g., a designated second state) may be smaller than the number (n) of pieces of image data received from the camera in another state (e.g., a designated first state) for controlling the camera based on the designated parameter. Since the parameter based on the external electronic device having higher processing power is used even though the electronic device receives the smaller number of pieces of image data, it is possible to synthesize an image having improved quality from the smaller number of pieces of image data. Since the parameter identified from the external electronic device in the second state is determined based on more diverse or complex information, the electronic device may synthesize an image having improved quality using the smaller number of pieces of image data (m pieces of image data) compared to when the image is synthesized in the first state.

The electronic device may include different numbers of cameras according to embodiments. For example, the electronic device may include one camera as in the embodiment of FIG. 3, or may include a plurality of cameras in another embodiment. Hereinafter, an embodiment of an electronic device including a plurality of cameras will be described in detail with reference to FIG. 8.

FIG. 8 is a block diagram illustrating the electronic device 101 including a plurality of cameras 180-1 and 180-2 according to an embodiment of the disclosure. The electronic device 101 of FIG. 8 may correspond to the electronic device 101 of FIGS. 1 to 2. At least one of the hardware components included in the electronic device 101 of FIG. 8 may correspond to the hardware component of the electronic device 101 of FIGS. 1 to 3. For example, the second processor 120, the memory 130, the display device 160, and the communication modules 190 of the electronic device 101 may correspond to the second processor 120, the memory 130, the display device 160, and the communication modules 190 of FIG. 3, respectively. For example, the communication module 350, the processor 355, and the memory 360 of the external electronic device 345 may correspond to the communication module 350, the processor 355, and the memory 360 of FIG. 3, respectively.

Referring to FIG. 8, the electronic device may include a plurality of cameras including a first camera 180-1 and a second camera 180-2. The plurality of cameras may be exposed to the outside through different portions of the housing of the electronic device. Processors 260-1 and 260-2 included in the first camera 180-1 and the second camera 180-2, respectively, may operate similarly to the processor 260 of FIG. 3. Image sensors 230-1 and 230-2 included in the first camera 180-1 and the second camera 180-2, respectively, may operate similarly to the image sensor 230 of FIG. 3.

According to various embodiments, the electronic device 101 may include a plurality of cameras operating based on different types or operating modes. The electronic device 101 may control the plurality of cameras based on different parameters so that the plurality of cameras operate based on different ISOs, shutter speeds, exposures, and aperture values. For example, the electronic device 101 may control the first camera 180-1 based on a parameter for obtaining a preview image output in the display device 160. In a state of controlling the first camera 180-1, the electronic device 101 may control the second camera 180-2 based on another parameter for obtaining image data to be transmitted to the external electronic device 345.

In an embodiment, the first camera 180-1 may correspond to a color camera (e.g., an RGB camera) that detects the brightness of each of a plurality of designated colors (e.g., red, green, and blue), such as the camera module 180 of FIG. 3, and the second camera 180-2 may correspond to a mono camera that detects the brightness and/or contrast of external light. The second camera 180-2 corresponding to the mono camera may detect contrast information in wider range than contrast information of the first camera 180-1 due to a loss of external light by a color filter of the first camera 180-1 (e.g., external light may be lost by 60% or more). The loss of the external light may be generated by the color filter in the first camera 180-1, for example, 60% or more.

In an embodiment in which the first camera 180-1 and the second camera 180-2 correspond to a color camera and a mono camera, respectively, the electronic device 101 may display a preview image (e.g., live-view of an external object being captured) in the display device 160 based on image data acquired from the first camera 180-1. The electronic device 101 may perform image processing, such as interpolation and/or noise reduction, on the image data acquired from the first camera 180-1 to generate an image file (e.g., an image file based on YUV format and/or JPEG format) used to display the preview image. The electronic device 101 may enhance the quality of the image data received from the first camera 180-1 based on contrast information received from the second camera 180-2.

The electronic device 101 according to an embodiment may transmit, to the external electronic device 345, at least one of image data received from the first camera 180-1 corresponding to the color camera or image data received from the second camera 180-2 corresponding to the mono camera. The external electronic device 345 may transmit information related to the image data received by the electronic device 101. The electronic device 101 may identify at least one parameter for controlling at least one of the first camera 180-1 or the second camera 180-2 based on the information. The electronic device 101 may control at least one of the first camera 180-1 or the second camera 180-2 based on the identified at least one parameter.

In an embodiment, the first camera 180-1 may have a first angle of view, and the second camera 180-2 may have a second angle of view smaller than the first angle of view. For example, the first angle of view of the first camera 180-1 may be 100°, and the second angle of view of the second camera 180-2 may be 40°. The first camera 180-1 having the first angle of view may correspond to a wide-angle camera, and the second camera 180-2 having the second angle of view may correspond to a telecamera.

In an embodiment in which the first camera 180-1 and the second camera 180-2 correspond to the wide-angle camera and the telecamera, respectively, the electronic device 101 may use the external electronic device 345 to capture an image at a magnification outside a magnification range supported by the first camera 180-1 and the second camera 180-2. For example, when the maximum value of the magnification supported by the second camera 180-2 corresponding to the telecamera is three times, the electronic device 101 may use the external electronic device 345 to control the second camera 180-2 or to process the image data acquired from the second camera 180-2, thereby capturing an image with a larger magnification (e.g., 5 times). In an embodiment of capturing an image having a magnification greater than or equal to the maximum value of the magnification supported by the second camera 180-2, the electronic device 101 may acquire a plurality of pieces of image data used to capture the image by controlling an optical system of the second camera 180-2 based on the external electronic device 345. The optical system may include, for example, a lens driver for supporting an optical image stabilizer (OIS) function.

In an embodiment, in response to a user input for adjusting the magnification (e.g., a pinch-to-zoom gesture performed within the UI 430 of FIG. 4C), the electronic device 101 may control the second camera 180-2 at least based on the external electronic device 345 while displaying the preview image in the display device 160 by using the image data received from the first camera 180-1. Displaying the preview image based on the image data received from the first camera 180-1 by the electronic device 101 despite the adjustment of the magnification by the user may be performed to reduce a disparity of the image data of each of the first camera 180-1 and the second camera 180-2 according to a difference in the positions of the first camera 180-1 and the second camera 180-2 in the housing of the electronic device 101. While displaying the preview image based on the image data received from the first camera 180-1, the electronic device 101 may control the second camera 180-2 in order to capture an enlarged image (e.g., a super resolution image). For example, the electronic device 101 may perform synthesis or photographing of multi-frame and/or HDR image of the second camera 180-2 based on the information identified by the external electronic device 345.

In an embodiment, the first camera 180-1 may correspond to a color camera, and the second camera 180-2 may correspond to a depth camera that detects a time-of-flight (ToF) of light. The second camera 180-2 may output a depth-map indicating a distance between at least a portion of an external object included in the angle of view of the second camera 180-2 and a reference location (e.g., the electronic device 101, the second camera 180-2, and/or the image sensor 230-2 of the second camera 180-2) based on, for example, the ToF.

In an embodiment in which the first camera 180-1 corresponds to a color camera and the second camera 180-2 corresponds to a depth camera, the electronic device 101 may process the image data acquired from the first camera 180-1 based on the processor 260-1 of the first camera 180-1 and may process information (e.g., the depth-map) acquired from the second camera 180-2 based on the processor 355 of the external electronic device 345. The processing of the information of the second camera 180-2 by the external electronic device 345 may include, for example, calibration and/or matching between the first camera 180-1 and the second camera 180-2.

In an embodiment, the first camera 180-1 may correspond to a color camera, and the second camera 180-2 may correspond to a camera for image recognition. For example, the second camera 180-2 may have fewer pixels than the first camera 180-1, may consume less power than the first camera 180-1, or may not perform color interpolation, thereby outputting a grayscale image. In an embodiment in which the first camera 180-1 corresponds to a color camera and the second camera 180-2 corresponds to a camera for image recognition, the electronic device 101 may receive the image data from the second camera 180-2 by controlling the second camera 180-2 based on the external electronic device 345 that performs image recognition. Hereinafter, the operation of the electronic device 101 including a plurality of cameras corresponding to different types will be described in detail with reference to FIG. 9.

Figure 9:
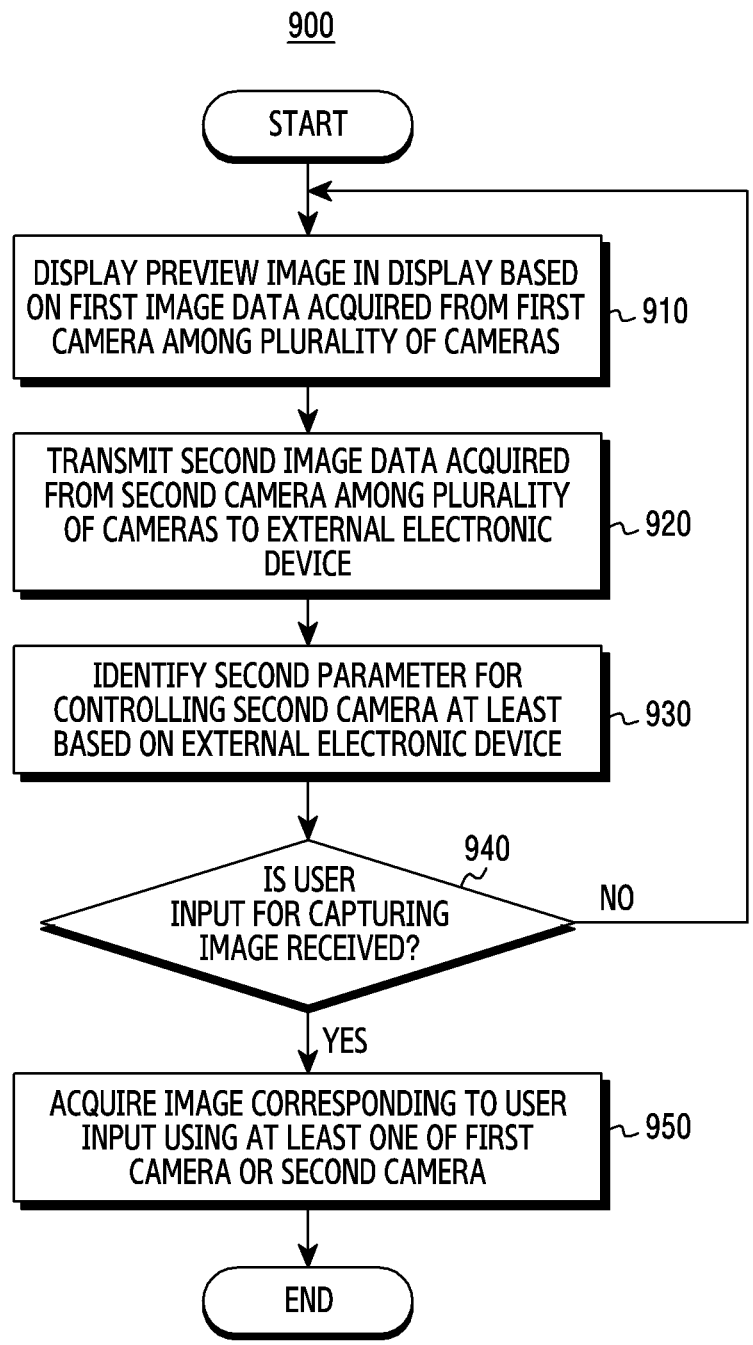
FIG. 9 is a flowchart illustrating an operation performed by an electronic device based on a plurality of cameras according to an embodiment of the disclosure.

FIG. 9 is a flowchart 900 illustrating an operation performed by an electronic device based on a plurality of cameras according to an embodiment of the disclosure. The electronic device of FIG. 9 may correspond to the electronic device 101 of FIG. 8. The operation of FIG. 9 may be performed by at least one of the electronic device 101 and the processors 260-1 and 260-2 of FIG. 8. At least one of the operations of FIG. 9 may be performed similarly to at least one of the operations of FIG. 5 and/or FIG. 7.

Referring to FIG. 9, in operation 910, the electronic device according to various embodiments may display a preview image on a display based on first image data obtained from a first camera among a plurality of cameras. The first camera may correspond to, for example, the first camera 180-1 of FIG. 8. In an embodiment, the first camera may be controlled by a first parameter of an ISP (e.g., the processor 260-1 of FIG. 8) included in the first camera. The first image data may be obtained by the first camera in which at least one of ISO, shutter speed, exposure or aperture is controlled by the first parameter.

Referring to FIG. 9, in operation 920, the electronic device according to various embodiments may transmit second image data obtained from a second camera among the plurality of cameras to an external electronic device. While displaying the preview image based on the first image data, the electronic device according to an embodiment may transmit the second image data obtained from the second camera among the plurality of cameras to the external electronic device different from the electronic device by using a communication circuit. The second camera may correspond to, for example, the second camera 180-2 of FIG. 8.

In an embodiment, the second camera may be controlled by an ISP (e.g., the processor 260-2 of FIG. 8) included in the second camera and/or a parameter at least based on the external electronic device. The parameter may include at least one of ISO sensitivity, shutter speed, exposure value, or aperture F value of the second camera required to perform image recognition of the external electronic device. In an embodiment, the electronic device may transmit, to the external electronic device, the second image data in which signals of a plurality of photodiodes included in the image sensor of the second camera are arranged based on a pattern of the plurality of photodiodes.

The second image data transmitted by the electronic device to the external electronic device may be distinguished according to the type of the second camera. For example, when the second camera corresponds to a mono camera, the second image data may display brightness and/or contrast of external light. For example, when the second camera has an angle of view different from that of the first camera (e.g., an angle of view based on a telecamera), the second image data may include an image at a narrower angle of view than the first image data. For example, when the second camera corresponds to a depth camera, the second image data may include a depth-map indicating a distance between an external object included in the second camera angle of view and a reference location. For example, when the second camera corresponds to a camera for image recognition, the second image data may have fewer pixels than the first image data, or may include a black and white image.

The external electronic device (e.g., the external electronic device 345 of FIG. 8) that has received the second image data transmitted based on operation 920 may acquire information related to the second image data. In an embodiment, the external electronic device may include at least one of information obtained by recognizing an external object included in the second image data, information for segmenting an external object, information indicating the depth of the second image data, information indicating preference of the user of the electronic device, contextual information related to a geographic location corresponding to the second image data, information about a person included in the second image data, subscription information of the user of the electronic device, information indicating the state of the external electronic device, or information indicating the state of the electronic device.

In an embodiment, the external electronic device may acquire different information from the second image data according to the second image data and/or the type of the second camera. For example, when the second camera corresponds to a mono camera, the external electronic device may acquire information (e.g., color matching information) for matching the color of external light included in the first image data and the brightness of external light included in the second image data. Alternatively, the external electronic device may acquire information to be used to control the first camera and/or the second camera based on the identification result (e.g., face or product) of the external object based on the second image data. Alternatively, the external electronic device may perform image processing for removing noise included in the second image data. Alternatively, the external electronic device may compensate for distortion of an image included in the second image data based on an optical distortion compensation. Alternatively, the external electronic device may perform image processing related to the second image data based on an exposure value and focus of the second camera. In an embodiment, the image processing performed on the second image data by the external electronic device may be used to perform image processing of the first image data obtained from the first camera.

For example, when the second camera has an angle of view different from that of the first camera (e.g., an angle of view based on a telecamera), the external electronic device may acquire information for ultra-resolution capture from the second image data. The information may include an image obtained by up-scaling the second image data and parameters of the first camera and/or the second camera required for ultra-resolution capture.

For example, when the second camera corresponds to the depth camera, the external electronic device may acquire information for matching the pixel of the first image data and the depth of the second image data. The matching may be performed in connection with optical coordination of the first camera and the second camera. Alternatively, the external electronic device may acquire a parameter related to the second camera that causes a feature point similar to a feature point of the first image data to be extracted in the second image data.

For example, when the second camera corresponds to a camera for image recognition, the external electronic device may perform image recognition using the second image data to acquire information related to the external object included in the second image data. In an embodiment, the external electronic device may transmit various types of information identified using the second image data to the electronic device.

Referring to FIG. 9, in operation 930, the electronic device according to various embodiments may identify a second parameter for controlling the second camera, at least based on the external electronic device. The electronic device according to an embodiment may receive, from the external electronic device, at least one of information for identifying the external object included in the second image data, information based on a location of the second image data, information based on the state of the electronic device, or information based on the state of the external electronic device. The electronic device may identify the second parameter based on at least one piece of information received from the external electronic device. The second parameter may be a parameter for controlling components and/or attributes of the second camera. In an embodiment, the electronic device may identify a parameter for controlling at least one of the first camera or the second camera, at least based on the external electronic device. In an embodiment, the electronic device may perform at least one of operations 920 and 930 in a state in which the preview image is displayed based on operation 910.

Referring to FIG. 9, in operation 940, the electronic device according to various embodiments may determine whether a user input for capturing an image is received. The user input may include at least one of a user input for touching the icon 432 of FIG. 4C, a user input for pressing a designated button of the electronic device, or a user input for inputting a voice signal including a voice command (e.g., "Take a picture"). When the user input for capturing an image is not received in operation 940-NO, the electronic device according to an embodiment may continually perform displaying of the preview image and identifying of the second parameter at least based on the external electronic device, based on operations 910, 920, and 930.

When the electronic device according to various embodiments receives the user input for capturing an image in operation 940-YES, in operation 950, an image corresponding to the user input may be acquired using at least one of the first camera or the second camera. In an embodiment, in response to the identification of the user input, the electronic device may acquire third image data from the second camera by controlling at least one of sensitivity (e.g., ISO sensitivity), shutter speed, exposure, or aperture F value of the second camera according to the second parameter identified based on operation 930. The third image data may have a quality different from that of the second image data of operation 920. The electronic device may capture or acquire an image corresponding to the user input, at least based on the third image data. The electronic device according to an embodiment may acquire the image corresponding to the user input by synthesizing the first image data received from the first camera and the third image data received from the second camera controlled by the second parameter. The image acquired by the electronic device may be stored in the memory of the electronic device (e.g., the memory 130 of FIG. 8).

The operation of acquiring the image based on operation 950 by the electronic device may be performed differently according to various embodiments of the electronic device including different types of cameras. In an embodiment in which the first camera and the second camera correspond to a color camera and a mono camera, respectively, the electronic device may adjust the exposure value or focus of the second camera based on the second parameter. Alternatively, the electronic device may control the first camera and/or the second camera so that the first camera can identify external light in a brightness region different from a brightness region of the image data of the second camera obtained based on the second parameter. The electronic device may acquire an image corresponding to a user input by synthesizing image data including a color image of the first camera and image data including a mono image of the second camera. For example, the electronic device may acquire an image of which dynamic region is expanded, based on contrast information of the second camera. The electronic device may synthesize different portions (e.g., a light region and a dark region) of a plurality of image data obtained by controlling the second camera based on different exposure values in order to acquire the image of which dynamic region is expanded. Alternatively, the electronic device may more greatly apply a gain of a relatively dark portion (e.g., a synthesis weight) than a gain of a relatively bright portion, from the plurality of image data obtained by controlling the second camera based on the same exposure value, thereby allowing data related to the dark portion to be acquired more clearly.

In an embodiment in which the first camera and the second camera correspond to a wide-angle camera and a telecamera, respectively, the electronic device may display a preview image using digital zoom based on the first image data received from the first camera. When receiving a user input for capturing an image, the electronic device may capture the image using digital zoom based on the first image data. The electronic device may transmit the second image data received from the second camera to the external electronic device in response to the user input. The electronic device may replace a first image captured using digital zoom based on the first image data with a second image based on the image data acquired by the second camera controlled by the second parameter identified at least based on the external electronic device that has received the second image data. The second parameter may be configured to minimize a disparity due to switching of the camera between the first image and the second image and to enhance the quality of the second image compared to the quality of the first image.

In an embodiment in which the first camera corresponds to a color camera and the second camera corresponds to a depth camera, the electronic device may process first image data of the first camera in the electronic device (e.g., in the processor 260-1 of FIG. 8). In a state in which the first image data is processed in the electronic device, the electronic device may process second image data of the second camera based on the electronic device and the external electronic device. For example, the second image data may be transmitted to the external electronic device based on operation 920, and the external electronic device may perform at least one of up-scaling or noise removal of the second image data. For example, the second parameter identified by the electronic device based on operation 930 may satisfy a capture condition that allows matching of the first image data and the second image data to be performed more accurately. As the electronic device controls the second camera using the second parameter identified at least based on the external electronic device, the accuracy of the depth camera may be improved, and a process for matching between the first image data and the second image data may be reduced.

In an embodiment in which the first camera corresponds to a color camera and the second camera corresponds to a camera for image recognition, the electronic device may control the second camera differently from the first camera based on the second parameter. The second parameter identified at least based on the external electronic device may be related to the type of an external object captured in the second image data identified by the external electronic device. In an embodiment, when the external object is a person, the electronic device may control the first camera to capture an image related to the person. For example, the electronic device may control the first camera to obtain an image with a low depth and a blurred background. The electronic device may control the second camera based on the second parameter so that the surrounding area including the person (e.g., landscape) is clearly captured. Accordingly, the electronic device may reduce the time and load required to analyze the external object using the external electronic device, and may capture and provide various types of images in response to one user input.

Figure 10:
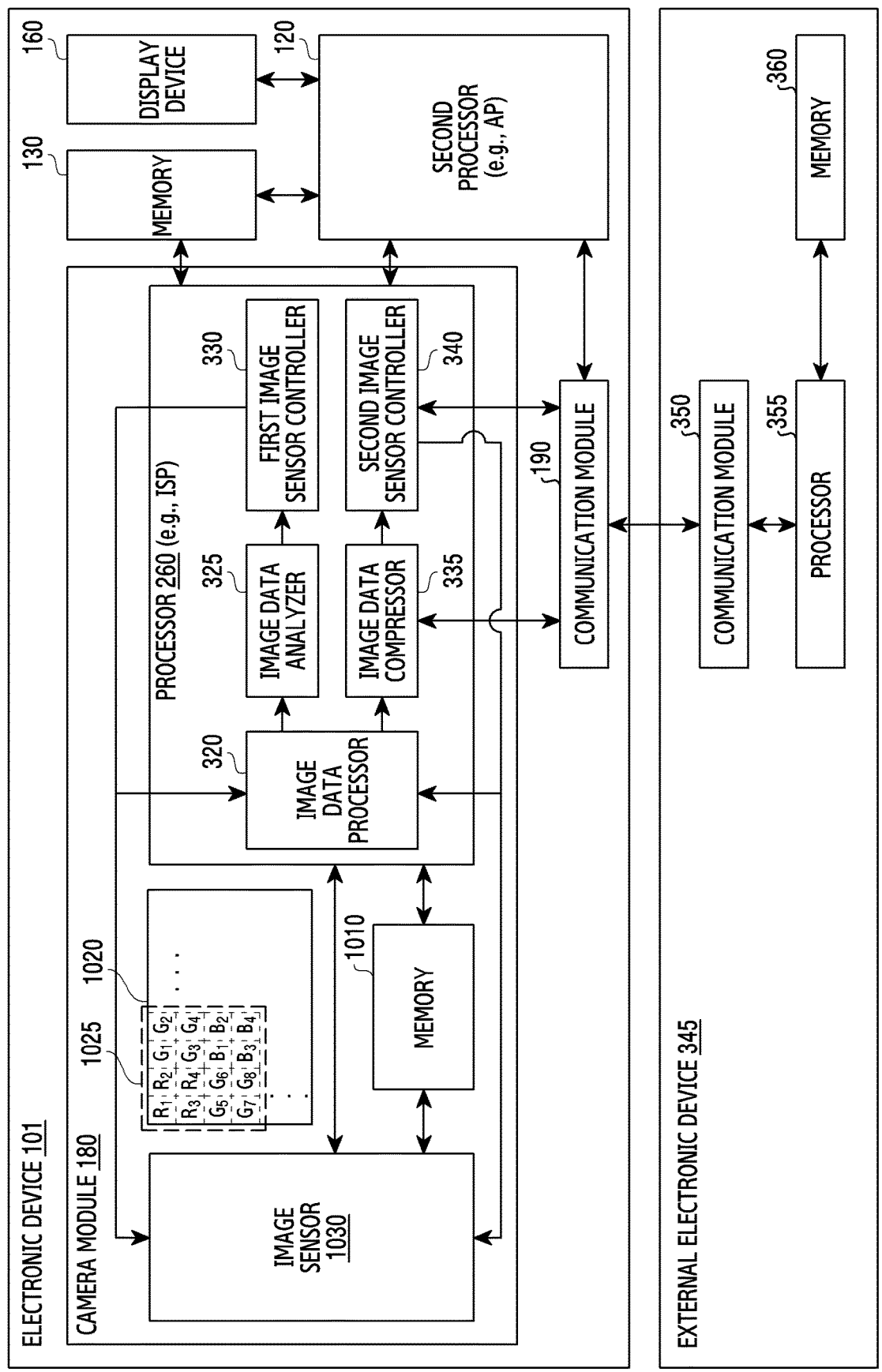
FIG. 10 is a block diagram illustrating an electronic device including an image sensor that outputs image data based on a designated pattern according to an embodiment of the disclosure.

FIG. 10 is a block diagram illustrating the electronic device 101 including an image sensor 1030 that outputs image data 1020 based on a designated pattern according to an embodiment of the disclosure. The electronic device 101 of FIG. 10 may correspond to the electronic device 101 of FIGS. 1 to 2. At least one of the hardware components included in the electronic device 101 of FIG. 10 may correspond to the hardware components of the electronic device 101 of FIGS. 1 to 3. For example, the second processor 120, the memory 130, the display device 160, and the communication module 190 of the electronic device 101 may correspond to the second processor 120, the memory 130, the display device 160, and the communication modules 190 of FIG. 3, respectively. For example, the communication module 350, the processor 355, and the memory 360 of the external electronic device 345 may correspond to the communication module 350, the processor 355, and the memory 360 of FIG. 3, respectively.

Referring to FIG. 10, the electronic device 101 according to various embodiments may include the camera module 180. The camera module 180 of FIG. 10 may include at least one (e.g., the processor 260) of the hardware components of the camera module 180 of FIGS. 2 to 3. The image sensor 1030 included in the camera module 180 may be an image sensor based on a designated pattern distinct from a Bayer pattern. For example, the image sensor 1030 may correspond to a Quadra sensor.

Within the image sensor 1030, a plurality of PDs detecting the same color may be arranged adjacent to each other. The image data 1020 output from the image sensor 1030 may be aligned based on the arrangement of the plurality of PDs within the image sensor 1030, and may include a plurality of electrical signals output from each of the plurality of PDs. Referring to FIG. 10, in a portion 1025 of the image data 1020, data R1 to R4 of each of a plurality of PDs receiving red light, data G1 to G8 of each of a plurality of PDs receiving green light, and data B1 to B4 of each of a plurality of PDs receiving blue light may be aligned according to the arrangement of the plurality of PDs within the image sensor 1030.

The image data 1020 received from the image sensor 1030 including the plurality of PDs based on a designated pattern distinct from the Bayer pattern may require a process for re-mosaic of the image data 1020 in addition to image processing corresponding to image data (e.g., the image data 310 of FIG. 3) based on the Bayer pattern. The re-mosaic may refer to an operation of converting the image data 1020 based on the designated pattern distinct from the Bayer pattern to obtain image data based on the Bayer pattern.

In order to reduce shutter lag or delay according to the process for re-mosaic, the electronic device 101 according to an embodiment may display a preview image displayed through the display device 160 based on the image data 1020 processed without performing the re-mosaic. For example, the electronic device 101 may display the preview image based on the image data 1020 without image recognition by the external electronic device 345. For example, the electronic device 101 may convert any one of the data of the plurality of PDs (e.g., R1 among R1 to R4) into a representative value of the plurality of PDs, or may use an average value of the data of the plurality of PDs (e.g., an average value of R1 to R4) as the representative value of the plurality of PDs.

While displaying the preview image, the electronic device 101 may at least temporarily store the image data 1020 received from the image sensor 1030 in the memory 1010 of the camera module 180. The electronic device 101 may transmit the image data 1020 stored in the memory 1010 to the external electronic device 345. The external electronic device 345 may transmit information related to the image data 1020 to the electronic device 101. Based on the information received from the external electronic device 345, the electronic device 101 may control the camera module 180 based on a parameter for capturing an image having a relatively high resolution. For example, the electronic device 101 may control the camera module 180 to have a longer exposure time compared to an image having a relatively small resolution.

Figure 11:
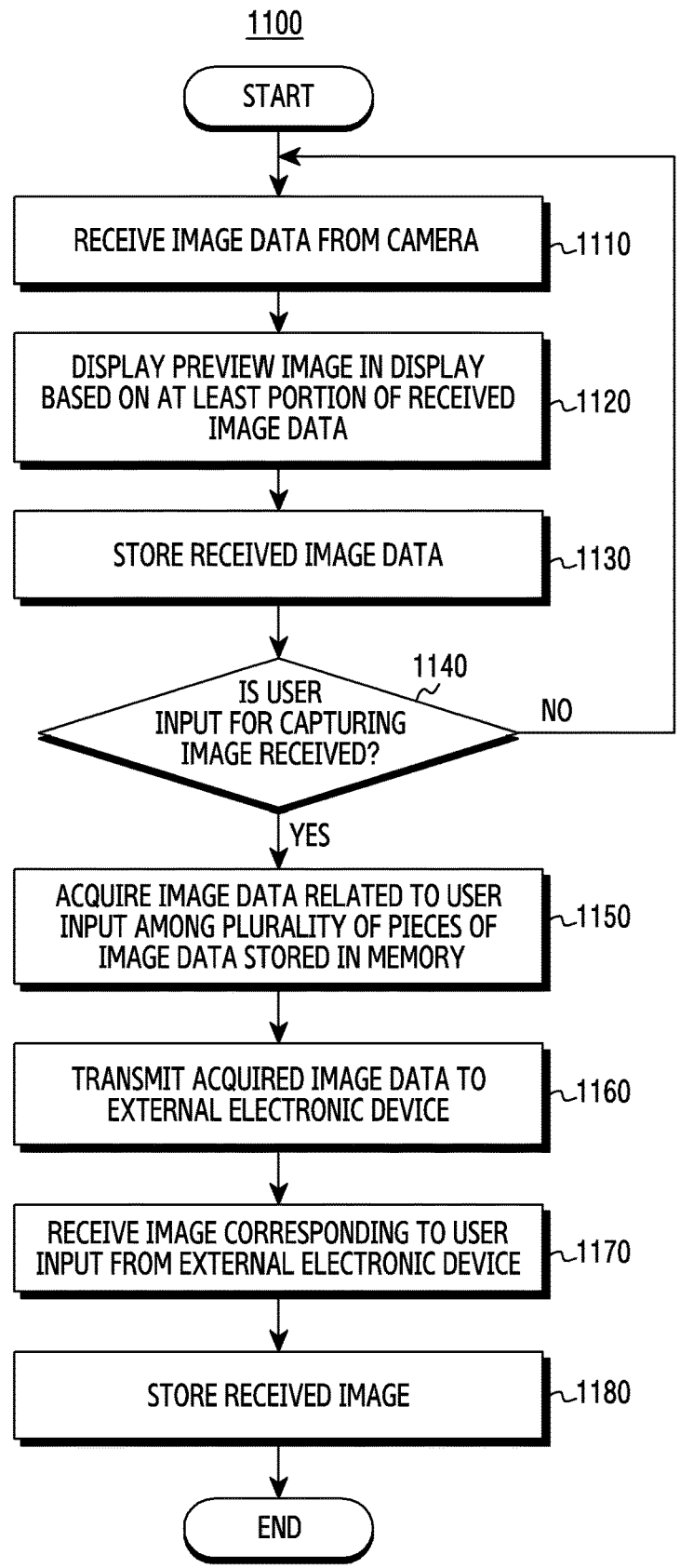
FIG. 11 is a flowchart illustrating an operation performed by an electronic device according to an embodiment of the disclosure.

FIG. 11 is a flowchart 1100 illustrating an operation performed by an electronic device according to an embodiment of the disclosure. The electronic device of FIG. 11 may correspond to the electronic device 101 of FIGS. 1 to 3 and 10. The operation of FIG. 11 may be performed by the electronic device 101, processor 260, and/or second processor 120 of FIG. 10. At least one of the operations of FIG. 11 may be performed similarly to at least one of the operations of FIG. 5 and/or the operations of FIG. 7.

Referring to FIG. 11, in operation 1110, the electronic device according to various embodiments may receive image data from a camera. The image data may be output from an image sensor (e.g., a Quadra sensor) in which a plurality of PDs are aligned based on a pattern distinct from a Bayer pattern. The electronic device may perform operation 1110 similarly to operation 510 of FIG. 5.

Referring to FIG. 11, in operation 1120, the electronic device according to various embodiments may display the preview image on a display based on at least a portion of the received image data. In a state in which the preview image is displayed, in operation 1130, the electronic device according to various embodiments may store the received image data. The electronic device may store the image data in, for example, a memory of the camera (e.g., the memory 1010 of FIG. 10).

Referring to FIG. 11, in operation 1140, the electronic device according to various embodiments may determine whether a user input for capturing an image is received. The user input may be an input similar to the user input in operation 710 of FIG. 7. When the user input is not received in operation 1140-NO, the electronic device may continuously perform displaying of the preview image and storing of the image data based on operations 1110, 1120, and 1130. In this case, a plurality of pieces of image data acquired at different viewpoints may be stored in the memory of the electronic device.

When the electronic device according to various embodiments receives the user input for capturing an image in operation 1140-YES, in operation 1150, the electronic device may acquire image data related to the user input among the plurality of pieces of image data stored in the memory. For example, the electronic device may acquire image data corresponding to a time point when the user input is received.

Referring to FIG. 11, in operation 1160, the electronic device according to various embodiments may transmit the acquired image data to the external electronic device. In an embodiment, the electronic device may perform operation 1160 in a manner similar to operation 520 of FIG. 5. The external electronic device may perform image processing based on the image data. The image processing may include, for example, an operation of obtaining a high resolution image from the image data based on the designated pattern distinct from the Bayer pattern.

Referring to FIG. 11, in operation 1170, the electronic device according to various embodiments may receive an image corresponding to the user input from the external electronic device. For example, the external electronic device may transmit a high resolution image obtained from the image data based on the designated pattern to the electronic device. In response to receiving the image, in operation 1180, the electronic device according to various embodiments may store the received image. The image received from the external electronic device may be stored in the memory of the electronic device (e.g., the memory 130 of FIG. 10).

Figure 12:
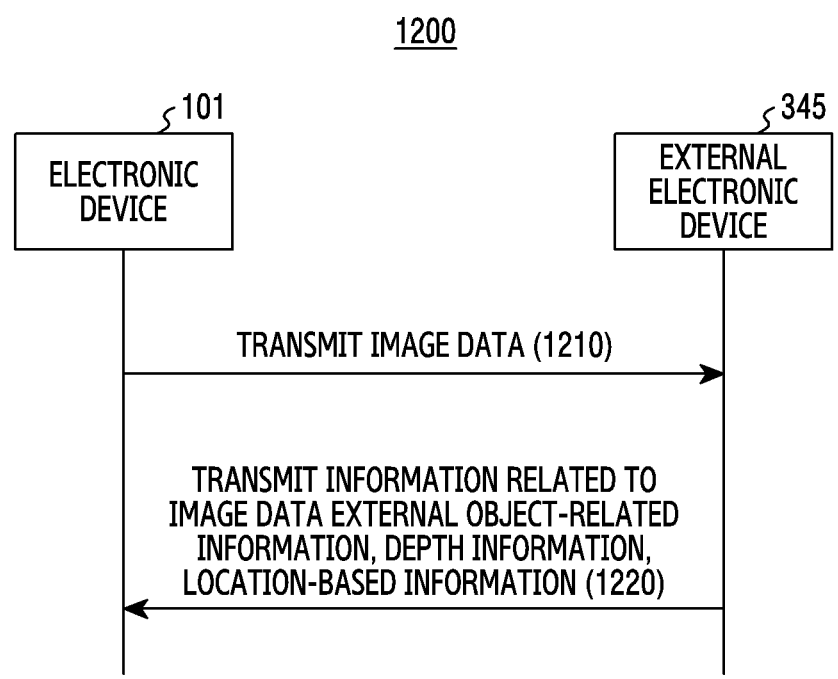
FIG. 12 is a signal flowchart between an electronic device and an external electronic device, according to an embodiment of the disclosure.

FIG. 12 is a signal flowchart 1200 between the electronic device 101 and the external electronic device 345, according to an embodiment of the disclosure. The electronic device 101 and the external electronic device 345 of FIG. 12 may correspond to the electronic device 101 and the external electronic device 345 of FIGS. 1 to 3, FIG. 8, and/or FIG. 10.

Referring to FIG. 12, in operation 1210, the electronic device 101 may transmit image data to the external electronic device 345. In an embodiment, the image data may correspond to image data (e.g., the image data 310 of FIG. 3) received from a camera by the electronic device 101 by controlling the camera based on a parameter related to the external electronic device 345 every designated period by the electronic device 101. In an embodiment, the image data may correspond to image data (e.g., image data received from the image sensor 230-2 of the second camera 180-2 of FIG. 8) received from another camera by the electronic device 101 in a state in which the electronic device 101 displays a preview image using any one camera among a plurality of cameras. The other camera may also be controlled based on the parameter related to the external electronic device 345. In an embodiment, the image data may be image data (e.g., the image data 1020 of FIG. 10) in which signals of a plurality of PDs are aligned according to the arrangement of the plurality of PDs according to a designated pattern distinct from the Bayer pattern.

The external electronic device 345 may identify information related to the image data from the image data transmitted based on operation 1210. In response to the identification of the information, in operation 1220, the external electronic device 345 may transmit information related to the image data. The information may include, for example, at least one of information related to an external object included in the image data, depth information of the image data, or information related to a location where the image data is captured. The electronic device 101 may identify a parameter for controlling the camera from the information transmitted based on operation 1220. For example, the electronic device 101 may identify the parameter for controlling the camera based on at least one of operation 530 of FIG. 5 or operation 930 of FIG. 9. The electronic device 101 may control the camera using the parameter identified at least based on the external electronic device 345, thereby acquiring the image data having an improved quality than that when controlling the camera without the external electronic device 345.

Figure 13:
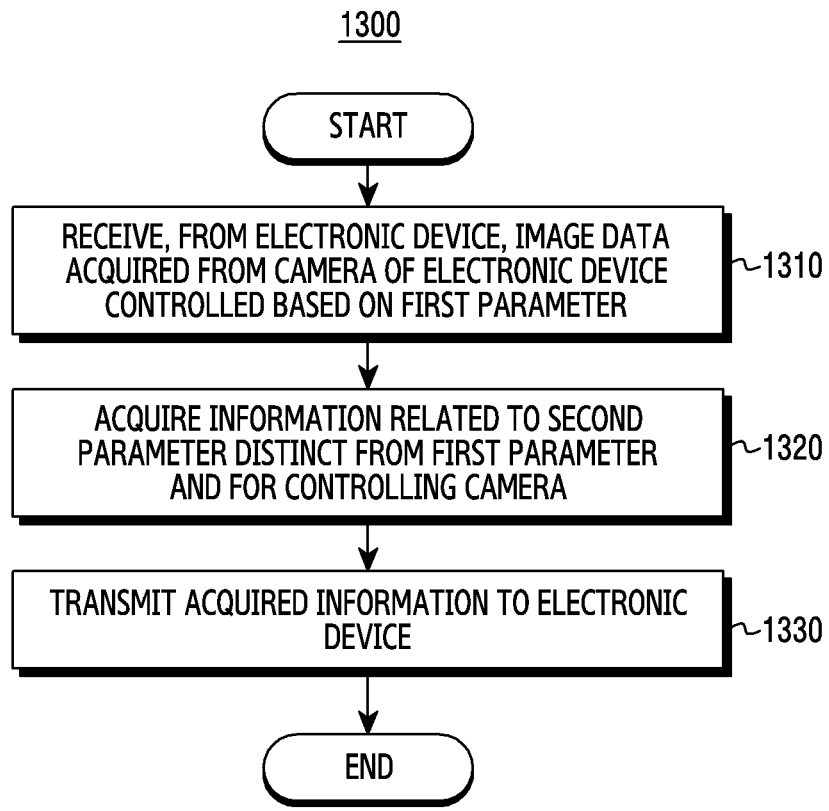
FIG. 13 is a flowchart illustrating operations of an external electronic device according to an embodiment of the disclosure.

FIG. 13 is a flowchart 1300 illustrating operations of an external electronic device according to an embodiment of the disclosure. The external electronic device of FIG. 13 may correspond to the external electronic device 345 of FIGS. 3, 8, and 10, and/or FIG. 12. The operations of FIG. 13 may be performed, for example, by the external electronic device 345 and/or processor 355 of FIGS. 3 and 8, or FIG. 10.

Referring to FIG. 13, in operation 1310, an external electronic device according to various embodiments may receive image data obtained from a camera of an electronic device controlled based on a first parameter from the electronic device. The first parameter may be a parameter for controlling at least one of ISO, shutter speed, exposure, or aperture of the camera of the electronic device. In an embodiment, the external electronic device may receive, from the electronic device, image data in which signals of a plurality of photodiodes included in an image sensor of the camera are aligned based on a pattern (e.g., a Bayer pattern) of the plurality of photodiodes within the image sensor. The image data may be transmitted by the electronic device that performs at least one of, for example, operation 520 of FIG. 5, operation 920 of FIG. 9, operation 1160 of FIG. 11, or operation 1210 of FIG. 12.

Referring to FIG. 13, in operation 1320, the external electronic device according to various embodiments may acquire information related to a second parameter for controlling the camera, which is distinct from the first parameter. The information may be acquired based on an external electronic device having higher processing power than the electronic device. In an embodiment, the external electronic device may acquire the second parameter for controlling the camera, which is distinct from the first parameter based on the received image data. The second parameter may be a parameter for controlling at least one of the sensitivity, shutter speed, exposure, or aperture of the camera of the electronic device. The external electronic device may acquire the information and/or the second parameter based on at least one of an external object included in the image data, a location of the external electronic device capturing the image data, or a state of each of the electronic device and the external electronic device.

Referring to FIG. 13, in operation 1330, the external electronic device according to various embodiments may transmit the acquired information to the electronic device. In an embodiment, the external electronic device may transmit the acquired information and/or the acquired second parameter to the electronic device. The information and/or the second parameter may be used to control the camera of the electronic device or to perform image processing of image data received from the camera.

Figure 14:
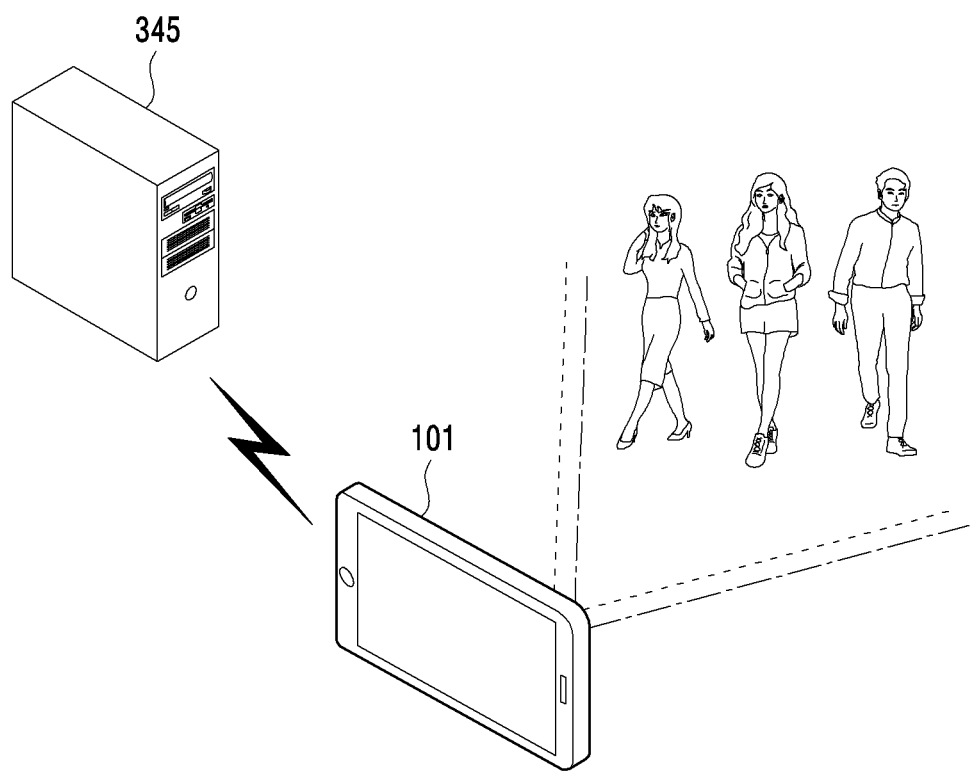
FIG. 14 is a diagram illustrating an operation in which an electronic device acquires an image using an external electronic device, according to an embodiment of the disclosure.

FIG. 14 is a diagram illustrating an operation in which the electronic device 101 acquires an image using the external electronic device 345, according to an embodiment of the disclosure. The electronic device 101 of FIG. 14 may correspond to the electronic device 101 of FIGS. 1 to 2 and/or FIG. 8. The external electronic device 345 of FIG. 14 may correspond to the external electronic device 345 of FIG. 3. In various embodiments, the electronic device 101 and the external electronic device 345 may be connected to each other through a network.

Referring to FIG. 14, the electronic device 101 of FIG. 14 may perform at least one of the operations of FIGS. 5, 7, and 9, and FIGS. 12 to 13. At least one of the hardware components included in the electronic device 101 of FIG. 14 may correspond to the hardware components of the electronic device 101 of FIGS. 1 to 3, and/or FIG. 8. For example, the electronic device 101 may include the first camera 180-1 and the second camera 180-2 of FIG. 8.

In an embodiment, the types of each of a plurality of cameras included in the electronic device 101 may be distinguished from each other. In an embodiment of FIG. 14, the electronic device 101 may include a first camera corresponding to a color camera (e.g., RGB camera) that detects brightness of each of a plurality of designated colors (e.g., red, green, and blue) and a second camera corresponding to a depth camera that detects a time-of-flight (ToF) of light. Hereinafter, with reference to FIG. 14, in a state in which a plurality of pieces of image data is acquired by gradually changing parameters of the camera, such as bracketing photograph, an operation in which the electronic device 101 uses the external electronic device 345 to acquire the smaller number of pieces of image data will be described.

For example, the user of the electronic device 101 may photograph a plurality of subjects (referring to FIG. 14, three people separated by different distances from each other from the electronic device 101) by gradually changing the focus, such as focus bracketing. When photographing is performed based on focus bracketing, the electronic device 101 may photograph the plurality of subjects by gradually changing the focus of a first camera corresponding to the color camera. In this case, the electronic device 101 may acquire three pieces of image data having a focal length corresponding to each of the three people.

In an embodiment, the electronic device 101 may control the first camera and the second camera based on the parameter received from the external electronic device 345. For example, the electronic device 101 may acquire one piece of image data having a focal length corresponding to all the three people from the first camera, and may acquire one piece of image data based on the depth map from the second camera. In this case, since the electronic device 101 acquires a total of two pieces of image data from each of the first camera and the second camera, the smaller number of pieces of image data may be acquired compared to when only the color camera is used.

By way of another example, the user of the electronic device 101 may photograph the plurality of subjects by gradually changing exposure, such as in exposure bracketing. When photographing is performed based on the exposure bracketing, the electronic device 101 may photograph the plurality of subjects by gradually changing the exposure of the first camera corresponding to the color camera. In this case, the electronic device 101 may acquire three pieces of image data having the exposure corresponding to each of the three people.

In an embodiment, when the electronic device 101 is controlled based on the parameter received from the external electronic device 345, the electronic device 101 may acquire two pieces of image data having the brightest exposure value and the darkest exposure value among the exposure values corresponding to the plurality of subjects. In this case, the electronic device 101 may identify the image data corresponding to an exposure value that is not captured based on the external electronic device 345. In this case, the electronic device 101 may acquire the smaller number of pieces of image data than that when the electronic device 101 is not controlled based on the external electronic device 345.

By way of another example, the user of the electronic device 101 may simultaneously perform focus bracketing and exposure bracketing to photograph the plurality of subjects. In a state where the control of the external electronic device 345 is stopped, the electronic device 101 may acquire three pieces of image data having a focal length corresponding to each of the three peoples and three pieces of image data having exposure corresponding to each of the three people. The electronic device 101 may acquire a total of six pieces of image data.

In an embodiment, when the electronic device 101 controls the first camera and the second camera based on the parameter received from the external electronic device 345, the electronic device 101 may acquire one piece of image data having a focal length corresponding to all of the three peoples and having the brightest exposure value, one piece of image data having the focal length and the darkest exposure value, and one piece of image data based on the depth map. The electronic device 101 may acquire a total of three pieces of image data. The electronic device 101 according to an embodiment may acquire the smaller number of pieces of image data based on the parameter received from the external electronic device 345, and may provide, to the user, an image having the same or improved quality or effect based on the smaller number of pieces of image data.

The electronic device and the external electronic device according to various embodiments may acquire the parameter for controlling the camera of the electronic device, based on the image data and information transmitted between the electronic device and the external electronic device. The image data transmitted between the electronic device and the external electronic device may be acquired, for example, by controlling the camera based on a designated parameter associated with the external electronic device by the electronic device. The information transmitted between the electronic device and the external electronic device may be, for example, information related to the image data obtained by performing image recognition on the image data by the external electronic device. In an embodiment, the external electronic device may perform image recognition based on higher processing power than the electronic device, and the electronic device may control the camera based on the information received from the external electronic device to acquire the image data having improved quality.

An electronic device according to various embodiments may include a camera, a communication circuit, and a processor configured to be operably coupled to the camera and the communication circuit. The processor may control the camera based on a first parameter, and may receive first image data from the camera. The processor may transmit the first image data to an external electronic device distinct from the electronic device by using the communication circuit in response to acquisition of the first image data. In addition, the processor may identify a second parameter distinct from the first parameter and for controlling the camera at least based on the external electronic device having received the first image data, and may acquire second image data by controlling the camera based on the second parameter in response to identification of the second parameter.

The processor of the electronic device according to an embodiment may acquire the second image data by controlling at least one of sensitivity, shutter speed, exposure, or aperture of the camera according to the second parameter.

The processor of the electronic device according to an embodiment may receive information related to the first image data from the external electronic device after transmitting the first image data, and may identify the second parameter based on the received information.

The processor of the electronic device according to an embodiment may receive, from the external electronic device, at least one of information for identifying an external object included in the first image data, information based on a location of the first image data, or information based on states of the electronic device and the external electronic device.

The electronic device according to an embodiment may further include a display. The processor may receive third image data by controlling the camera based on a third parameter distinct from the first parameter. In addition, the processor may display a preview image within the display based on the third image data in response to reception of the third image data, and may receive the first image data by controlling the camera based on the first parameter while displaying the preview image.

The electronic device according to an embodiment may transmit, to the external electronic device, the first image data in which signals of a plurality of photodiodes included in an image sensor of the camera are aligned based on a pattern of the plurality of photodiodes within the image sensor.

The processor of the electronic device according to an embodiment may capture an image based on a plurality of pieces of image data acquired by controlling the camera based on the second parameter in response to reception of a user input for capturing the image in a first state in which the second parameter is identified. In addition, the processor may capture the image based on a plurality of pieces of image data acquired by controlling the camera based on a designated third parameter distinct from the second parameter in response to reception of the user input in a second state distinct from the first state. The number of the plurality of pieces of image data acquired to capture the image in the first state is smaller than the number of the plurality of pieces of image data acquired to capture the image in the second state.

The processor of the electronic device according to an embodiment may acquire a third parameter for controlling at least one of sensitivity, shutter speed, exposure, or aperture of the camera based on the first image data independently from the second parameter and the external electronic device.

An electronic device according to various embodiments may include: a plurality of cameras; a communication circuit; a display; and at least one processor configured to be operably coupled to the plurality of cameras, the communication circuit, and the display. The at least one processor may display a preview image within the display based on first image data acquired from a first camera among the plurality of cameras, the first camera being controlled by a first parameter of an ISP included in the first camera, may transmit, to an external electronic device distinct from the electronic device, second image data acquired from a second camera among the plurality of cameras by using the communication circuit while displaying the preview image based on the first image data, may identify a second parameter for controlling the second camera at least based on the external electronic device having received the second image data, and may acquire, in response to identification of a user input for capturing an image while displaying the preview image, the image corresponding to the user input by using at least one of the first camera or the second camera.

The at least one processor of the electronic device according to an embodiment may acquire third image data from the second camera by controlling at least one of sensitivity, shutter speed, exposure, or aperture of the second camera according to the second parameter in response to identification of the user input, and may acquire the image corresponding to the user input at least based on the third image data.

The at least one processor of the electronic device according to an embodiment may receive, from the external electronic device, at least one of information for identifying an external object included in the second image data, information based on a location of the second image data, or information based on states of the electronic device and the external electronic device. In addition, the at least one processor may identify the second parameter based on the at least one information received from the external electronic device.

The at least one processor of the electronic device according to an embodiment may transmit, to the external electronic device, the second image data acquired from the second camera corresponding to a mono camera that detects brightness of external light. In addition, the at least one processor may identify a dynamic range related to the first camera corresponding to a color camera from the external electronic device having received the second image data. The at least one processor may acquire the image by controlling the first camera based on the dynamic range in response to identification of the user input for capturing the image.

The at least one processor of the electronic device according to an embodiment may transmit, to the external electronic device, the second image data acquired from the second camera having a second angle of view smaller than a first angle of view of the first camera. In addition, the at least one processor may receive, in response to identification of the user input for capturing the image based on a third angle of view smaller than the second angle of view, third image data corresponding to the third angle of view based on the second image data from the external electronic device. The at least one processor may store the received third image data in a memory of the electronic device.

The at least one processor of the electronic device according to an embodiment may transmit, to the external electronic device, the second image data acquired from the second camera corresponding to a depth camera that detects a time-of-flight (ToF) of light. In addition, the at least one processor may identify depth information indicating a depth of each of a plurality of pixels included in the first image data acquired from the first camera by controlling the second camera based on the second parameter identified from the external electronic device in response to identification of the user input for capturing the image. The at least one processor may acquire the image corresponding to the user input based on the identified depth information.

The at least one processor of the electronic device according to an embodiment may transmit, to the external electronic device, the second image data in which signals of a plurality of photodiodes included in an image sensor of the second camera are aligned based on a pattern of the plurality of photodiodes within the image sensor.

A method of an electronic device according to various embodiments may include receiving, from an external electronic device distinct from the electronic device, image data acquired from a camera of the external electronic device controlled based on a designated first parameter; acquiring a second parameter distinct from the first parameter and for controlling the camera based on the received image data; and transmitting the acquired second parameter to the external electronic device.

In the method of the electronic device according to an embodiment, the acquiring of the second parameter may include acquiring the second parameter for controlling at least one of sensitivity, shutter speed, exposure, or aperture of the camera.

In the method of the electronic device according to an embodiment, the acquiring of the second parameter may include acquiring the second parameter based on at least one of an external object included in the image data, a location of the external electronic device that captures the image data, or states of the electronic device and the external electronic device.

In the method of the electronic device according to an embodiment, the receiving of the image data may include receiving the image data in which signals of a plurality of photodiodes included in an image sensor of the camera are aligned based on a pattern of the plurality of photodiodes within the image sensor.

The method of the electronic device according to an embodiment may further include: receiving, from the external electronic device, a request for capturing an image based on a second angle of view smaller than a first angle of view of the camera; acquiring second image data based on the second angle of view from image data based on the first angle of view of the camera in response to reception of the request; and transmitting the acquired second image data to the electronic device.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device. In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a camera;
    a display;
    a communication circuit; and
    a processor configured to be operably coupled to the camera, the display, and the communication circuit,
    wherein the processor is further configured to:
        receive first image data from the camera by controlling the camera based on a first parameter,
        transmit the first image data to an external electronic device corresponding to at least one server for performing image recognition of image data by using the communication circuit in response to receiving the first image data from the camera, wherein the image recognition of the transmitted first image data is performed and an external object is extracted from the transmitted first image data by the external electronic device,
        receive information for identifying the external object extracted by the external electronic device from the transmitted first image data,
        identify a second parameter for controlling the camera at least based on the received information,
        identify a third parameter independently from the external electronic device,
        acquire second image data by controlling the camera based on the second parameter and third image data by controlling the camera based on the third parameter,
        display, by controlling the display, a preview image based on the third image data,
        transmit, in response to identification of a user input for capturing an image while displaying the preview image, the second image data to the external electronic device,
        receive, from the external electronic device, a high-resolution image as a response to the transmission of the second image data, and
        store the high-resolution image.

2. The electronic device of claim 1, wherein the processor is further configured to acquire the second image data by controlling at least one of sensitivity, shutter speed, exposure, or aperture of the camera according to the second parameter.

3. The electronic device of claim 1, wherein the processor is further configured to receive, from the external electronic device, at least one of information based on a location of the first image data, or information based on states of the electronic device and the external electronic device.

4. The electronic device of claim 1, wherein the electronic device transmits, to the external electronic device, the first image data in which signals of a plurality of photodiodes included in an image sensor of the camera are aligned based on a pattern of the plurality of photodiodes within the image sensor.

5. The electronic device of claim 1, wherein the processor is further configured to:
capture the image based on a plurality of pieces of image data acquired by controlling the camera based on the second parameter in response to reception of the user input for capturing the image when the processor is in a first state in which the second parameter is identified, and
capture the image based on a plurality of pieces of image data acquired by controlling the camera based on the third parameter in response to reception of the user input when the processor is in a second state, and
wherein a number of the plurality of pieces of image data acquired to capture the image in the first state is smaller than a number of the plurality of pieces of image data acquired to capture the image in the second state.

6. The electronic device of claim 1, wherein the processor is further configured to acquire the third parameter for controlling at least one of sensitivity, shutter speed, exposure, or aperture of the camera based on the first image data independently from the second parameter and the external electronic device.

7. An electronic device comprising:
a plurality of cameras;
a communication circuit;
a display; and
at least one processor configured to be operably coupled to the plurality of cameras, the communication circuit, and the display,
wherein the at least one processor is further configured to:
display a preview image within the display based on first image data acquired from a first camera among the plurality of cameras, the first camera being controlled by a first parameter of an image signal processor (ISP) included in the first camera,
transmit, to an external electronic device corresponding to at least one server for performing image recognition of image data, second image data acquired from a second camera among the plurality of cameras by using the communication circuit while displaying the preview image based on the first image data, wherein the image recognition of the transmitted second image data is performed and an external object is extracted from the transmitted second image data by the external electronic device,
receive information for identifying the external object extracted by the external electronic device from the transmitted second image data,
identify a second parameter for controlling the second camera at least based on the received information,
acquire third image data by controlling the second camera based on the second parameter, and
acquire, in response to identification of a user input for capturing an image while displaying the preview image, the image corresponding to the user input based on the first image data and the third image data.

8. The electronic device of claim 7, wherein the at least one processor is further configured to:
acquire the third image data from the second camera by controlling at least one of sensitivity, shutter speed, exposure, or aperture of the second camera according to the second parameter in response to identification of the user input.

9. The electronic device of claim 7, wherein the at least one processor is further configured to:
receive, from the external electronic device, at least one of information based on a location of the second image data, or information based on states of the electronic device and the external electronic device, and
identify the second parameter based on the at least one information of the information based on the location of the second image data, or the information based on the states of the electronic device and the external electronic device.

10. The electronic device of claim 7, wherein the at least one processor is further configured to:
transmit, to the external electronic device, the second image data acquired from the second camera corresponding to a mono camera that detects brightness of external light,
identify a dynamic range related to the first camera corresponding to a color camera from the external electronic device having received the second image data, and
acquire the image by controlling the first camera based on the dynamic range in response to identification of the user input for capturing the image.

11. The electronic device of claim 7, wherein the at least one processor is further configured to:
transmit, to the external electronic device, the second image data acquired from the second camera having a second angle of view smaller than a first angle of view of the first camera,
receive, in response to identification of the user input for capturing the image based on a third angle of view smaller than the second angle of view, third image data corresponding to the third angle of view based on the second image data from the external electronic device, and
store the received third image data in a memory of the electronic device.

12. The electronic device of claim 7, wherein the at least one processor is further configured to:
transmit, to the external electronic device, the second image data acquired from the second camera corresponding to a depth camera that detects a time-of-flight (ToF) of light,
identify depth information indicating a depth of each of a plurality of pixels included in the first image data acquired from the first camera by controlling the second camera based on the second parameter identified from the external electronic device in response to identification of the user input for capturing the image, and
acquire the image corresponding to the user input based on the identified depth information.

13. The electronic device of claim 7, wherein the at least one processor is further configured to transmit, to the external electronic device, the second image data in which signals of a plurality of photodiodes included in an image sensor of the second camera are aligned based on a pattern of the plurality of photodiodes within the image sensor.

14. A method of an electronic device corresponding to at least one server for performing image recognition of image data, comprising:
receiving, from an external electronic device, image data acquired from a camera of the external electronic device, wherein the camera is controlled based on a designated first parameter;
performing the image recognition of the image data and extracting an external object from the image data;
acquiring a second parameter for controlling the camera based on the external object extracted from the image data;
transmitting the acquired second parameter to the external electronic device;
receiving second image data acquired based on the second parameter from the external electronic device;
acquiring a high-resolution image based on the second image data; and
transmitting the high-resolution image to the external electronic device.

15. The method of claim 14, wherein the second parameter comprises a parameter for controlling at least one of sensitivity, shutter speed, exposure, or aperture of the camera.

16. The method of claim 14, further comprising acquiring the second parameter based on at least one of a location of the external electronic device that captures the image data, or states of the electronic device and the external electronic device.

17. The method of claim 14, further comprising receiving the image data in which signals of a plurality of photodiodes included in an image sensor of the camera are aligned based on a pattern of the plurality of photodiodes within the image sensor.

18. The method of claim 14, further comprising:
receiving, from the external electronic device, a request for capturing an image based on a second angle of view smaller than a first angle of view of the camera;
acquiring second image data based on the second angle of view from image data based on the first angle of view of the camera in response to reception of the request; and
transmitting the acquired second image data to the electronic device.

* * * * *